(12) United States Patent
Jones

(10) Patent No.: US 9,334,832 B2
(45) Date of Patent: May 10, 2016

(54) AIRFLOW ENRICHING DEVICE

(71) Applicant: BASIC TECHNOLOGY CORPORATION, Nampa, ID (US)

(72) Inventor: Thomas Jones, Fallon, NV (US)

(*) Notice: Subject to any disclaimer, the term of this patent is extended or adjusted under 35 U.S.C. 154(b) by 0 days.

(21) Appl. No.: 14/375,348

(22) PCT Filed: Jan. 30, 2014

(86) PCT No.: PCT/US2014/013781
§ 371 (c)(1),
(2) Date: Jul. 29, 2014

(87) PCT Pub. No.: WO2014/120889
PCT Pub. Date: Aug. 7, 2014

(65) Prior Publication Data
US 2015/0337766 A1 Nov. 26, 2015

Related U.S. Application Data

(60) Provisional application No. 61/758,435, filed on Jan. 30, 2013, provisional application No. 61/774,135, filed on Mar. 7, 2013, provisional application No. 61/859,068, filed on Jul. 26, 2013.

(51) Int. Cl.
*B01F 3/04* (2006.01)
*F02M 17/22* (2006.01)
(Continued)

(52) U.S. Cl.
CPC ............ *F02M 17/22* (2013.01); *B01F 3/04106* (2013.01); *B01F 3/04262* (2013.01); *F02D 28/00* (2013.01); *F02M 31/18* (2013.01);
(Continued)

(58) Field of Classification Search
CPC .................. B01F 3/04; B01F 3/04106; B01F 2003/04191; B01F 3/04262; F02M 7/24
USPC ............. 123/522; 261/38, 64.1, 119.1, 121.1, 261/126, DIG. 83
See application file for complete search history.

(56) References Cited

U.S. PATENT DOCUMENTS

| 474,838 A | 5/1892 | Lambert |
|---|---|---|
| 1,938,497 A | 12/1933 | Pogue |
| 1,972,874 A | 9/1934 | Dobbs |

(Continued)

FOREIGN PATENT DOCUMENTS

| AU | 8313275 A | 1/1977 |
|---|---|---|
| GB | 727333 A | 3/1955 |

(Continued)

OTHER PUBLICATIONS

International Searching Authority. International Search Report and Written Opinion on International Application for PCT/US14/13781, mailed on May 26, 2014.

*Primary Examiner* — Robert A Hopkins
(74) *Attorney, Agent, or Firm* — Buchanan Nipper

(57) ABSTRACT

An airflow enriching device for an internal combustion engine having an intake manifold. The airflow enriching device having a reaction chamber operable to hold a supply of liquid fuel at a selected level therein, and a vapor flow controller. The reaction chamber having an aerator submerged below said selected level of liquid fuel. The aerator for bubbling a supply of air through the fuel to form an enriched airflow. The vapor flow controller for controlling the flow of the enriched airflow into the intake manifold of the engine.

18 Claims, 17 Drawing Sheets

(51) Int. Cl.
*F02M 31/18* (2006.01)
*F02D 28/00* (2006.01)

(52) U.S. Cl.
CPC .... *F02M31/186* (2013.01); *B01F 2003/04191* (2013.01); *Y02T 10/126* (2013.01)

(56) References Cited

U.S. PATENT DOCUMENTS

| | | |
|---|---|---|
| 2,030,922 A | 2/1936 | Hirth |
| 2,216,664 A | 10/1940 | Fremd |
| 3,338,223 A | 8/1967 | Williams |
| 3,749,376 A | 7/1973 | Alm |
| 4,011,847 A | 3/1977 | Fortino |
| 4,171,332 A | 10/1979 | Gohnert |
| 4,177,779 A | 12/1979 | Ogle |
| 4,386,593 A | 6/1983 | Tibbs |
| 4,421,087 A | 12/1983 | Schuurman |
| 4,858,582 A | 8/1989 | Brown |
| 5,074,273 A | 12/1991 | Brown |
| 5,117,794 A | 6/1992 | Leshner et al. |
| 6,125,797 A | 10/2000 | Dupointe |
| 6,155,239 A * | 12/2000 | Dykstra ......... B60K 15/00 123/522 |
| 6,746,002 B2 | 6/2004 | Jones |
| 8,220,441 B2 | 7/2012 | Webb et al. |
| 2010/0012102 A1 | 1/2010 | Webb et al. |
| 2012/0255527 A1 | 10/2012 | Webb et al. |

FOREIGN PATENT DOCUMENTS

| | | |
|---|---|---|
| GB | 2042076 A | 9/1980 |
| WO | 2009122394 A2 | 10/2009 |

* cited by examiner

AIRFLOW ENRICHING DEVICE

TECHNICAL FIELD

The present invention generally relates to internal combustion engines, and more particularly relates to airflow enriching devices utilizing the bubbling of air through a liquid fuel source to create an enriched airflow for combustion in an internal combustion engine.

BACKGROUND OF THE INVENTION

Due to the ever rising price of gasoline and the continued popularity of motor vehicles as a mode of transportation, much effort in the prior art has been directed to increasing the efficiency of internal combustion engines. In addition, and often to the detriment of increasing the efficiency of internal combustion engines, further efforts in the prior art have been directed toward reducing the various pollutants emitted from motor vehicles. Needless to say, the prior art includes many different approaches to the problems of increasing the efficiency of internal combustion engines and for reducing the pollutants thereof.

A carburetor is a device that blends air and fuel for an internal combustion engine. The typical carburetor utilizes suction created by intake air accelerated through a Venturi tube to draw fuel into the internal combustion engines airstream for burning. A fuel injection system is a system for admitting fuel into an internal combustion engine by atomizing fuel by forcibly pumping it through a small nozzle under high pressure.

The primary problem with carburetors and fuel injector systems is that they are inadequate in breaking the fuel into small enough droplets. This results in the presence of relatively large droplets of fuel which will not completely vaporize in the intake manifold and/or engine. The result is low engine operating efficiency with formation of carbon monoxide and high hydrocarbon emissions. It therefore becomes desirable to produce a carburetor/fuel injector system improvement that will break up the larger droplets of fuel and disperse them more evenly, increasing the efficiency of the engine by burning more of the fuel.

The prior art knows many different means of atomizing and vaporizing the fuel. One type of such a vaporization system uses a source of air which is bubbled through a reservoir of liquid gasoline, the resulting vapors being inputted into the combustion chamber of the engine. Various patents exist for similar types of devices, for instance, U.S. Pat. Nos. 474,838, 1,938,497, 3,749,376 and 4,011,847.

SUMMARY OF THE DISCLOSURE

Several exemplary airflow enriching devices and methods of enriching the air intake airflow of internal combustion engines are described herein.

A first exemplary airflow enriching device is for an internal combustion engine having an intake manifold. The device has a reaction chamber and a vapor flow controller. The reaction chamber is operable to hold a supply of liquid fuel at a selected level therein. The reaction chamber has an aerator submerged below the selected level of liquid fuel. The aerator fluidly connects with an air supply line, the air supply line preferably supplying a flow of air via a vacuum regulated air source.

The reaction chamber defines an air-fuel vapor mixing chamber. The flow of air is bubbled through the fuel thereby creating an enriched airflow. The air-fuel vapor mixing chamber fluidly connects to a vapor flow controller via an inlet conduit. The vapor flow controller is for controlling the flow of the enriched airflow into the intake manifold of the engine. The vapor flow controller having an enriched airflow passageway which is interrupted by an actuator valve. The passageway fluidly connects at a first end with the inlet conduit, and at a second end with an outlet conduit. The vapor flow controller further has an actuator for opening and closing the actuator valve. The outlet conduit fluidly connects with the intake manifold of the engine.

Optionally, the aerator is made of a top plate spaced apart from a bottom plate, the plates defining a chamber therebetween. The aerator having plurality of bubbler holes defined through at least one of the top and bottom plates.

Optionally, the vacuum regulated air source includes a vacuum regulator. Optionally, the device includes an enriched airflow generator for creating a pressure differential in the enriched airflow.

Optionally, the internal combustion engine is in a vehicle, the vehicle has a computer system, and the actuator is electronically controlled by the computer system. Preferably, the internal combustion engine has a throttle body comprising a butterfly valve configured to be opened and closed, and the actuator is wired in parallel with the throttle body to the computer system so that the opening of the butterfly valve also results in the opening of the actuator valve, and, likewise, the closing of the butterfly valve also results in the closing of the actuator valve.

Optionally, the internal combustion engine has a throttle body comprising a butterfly valve configured to be opened and closed, and the actuator is second throttle body.

Optionally, the internal combustion engine includes a throttle body, and the actuator is wired in parallel with the throttle body.

Optionally, the device includes a throttle body spacer having a throttle body spacer inlet port. Preferably, the outlet conduit fluidly connects with the throttle body spacer inlet port, and the throttle body spacer is configured for attachment an airflow intake system of the engine. Further preferably, the throttle body spacer attaches to the airflow intake system between the intake manifold and throttle body.

Optionally, the vacuum pressure contained within the reaction chamber is maintained at a pressure of between 203.2 mmHg and 254 mmHg.

Optionally, the device includes a heater for maintaining the fuel in the reaction chamber at a temperature of between 38° C. and 54.5° C., preferably at about 49° C.

Exemplary methods of enriching intake airflow into an internal combustion engine having an intake manifold are also described. An exemplary method comprises the steps of: under vacuum pressure, bubbling an airflow through a volume of fuel contained in a reaction chamber to form an enriched airflow; maintaining the vacuum pressure in the reaction chamber between at about 203.2 mmHg and 254 mmHg; maintaining the fuel in the reaction chamber at a temperature of between 38° C. and 54.5° C.; and injecting the enriched airflow into the intake manifold of the internal combustion engine. Preferably, the method further comprises the step of compressing the enriched airflow before performing the step of injecting the enriched airflow into the intake manifold of the internal combustion engine.

Additional understanding of the devices and methods contemplated and/or claimed by the inventor can be gained by reviewing the detailed description of exemplary devices and methods, presented below, and the referenced drawings.

DETAILED DESCRIPTION

Figure 1:
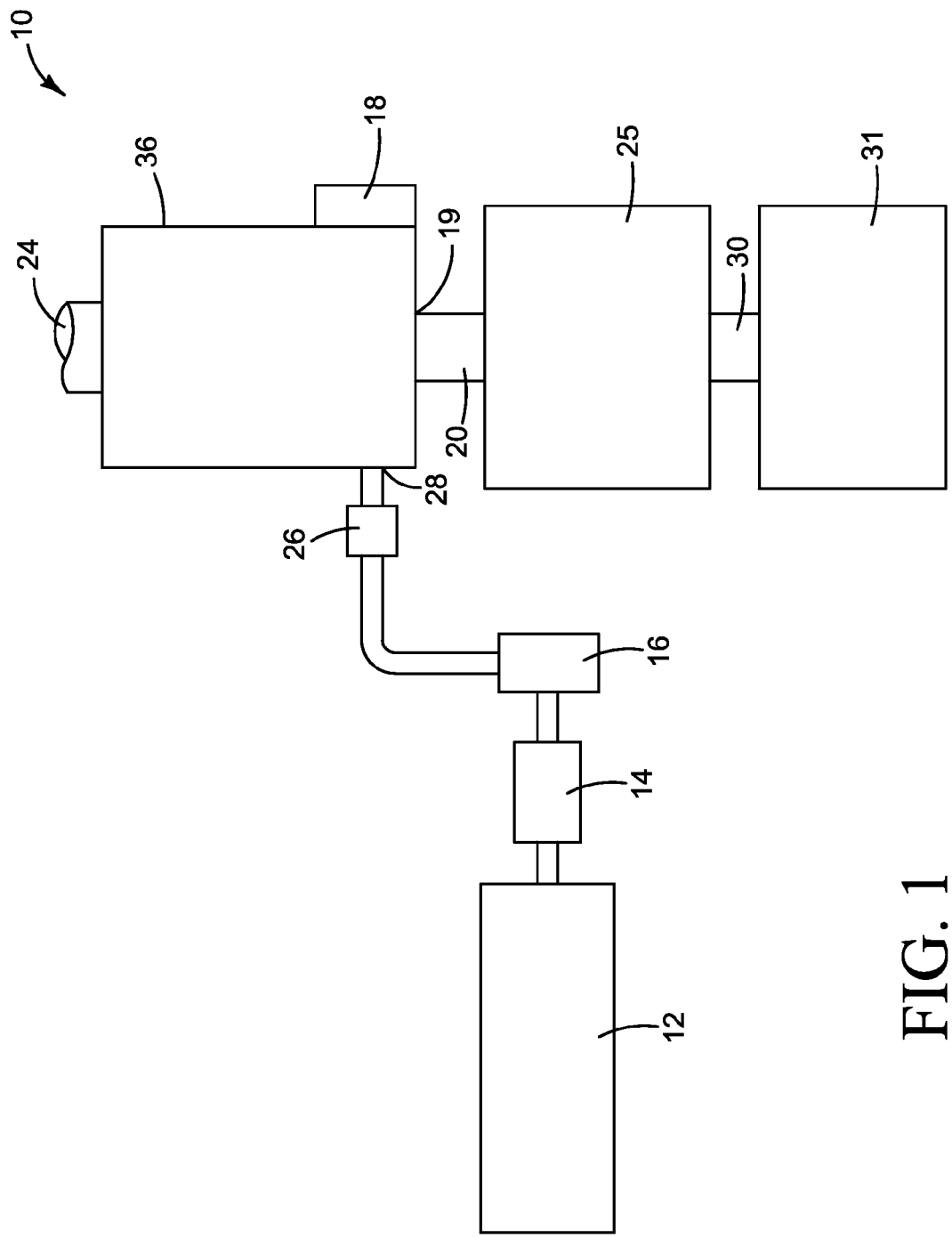
FIG. 1 is a schematic representation of a first exemplary airflow enriching device.
Figure 2:
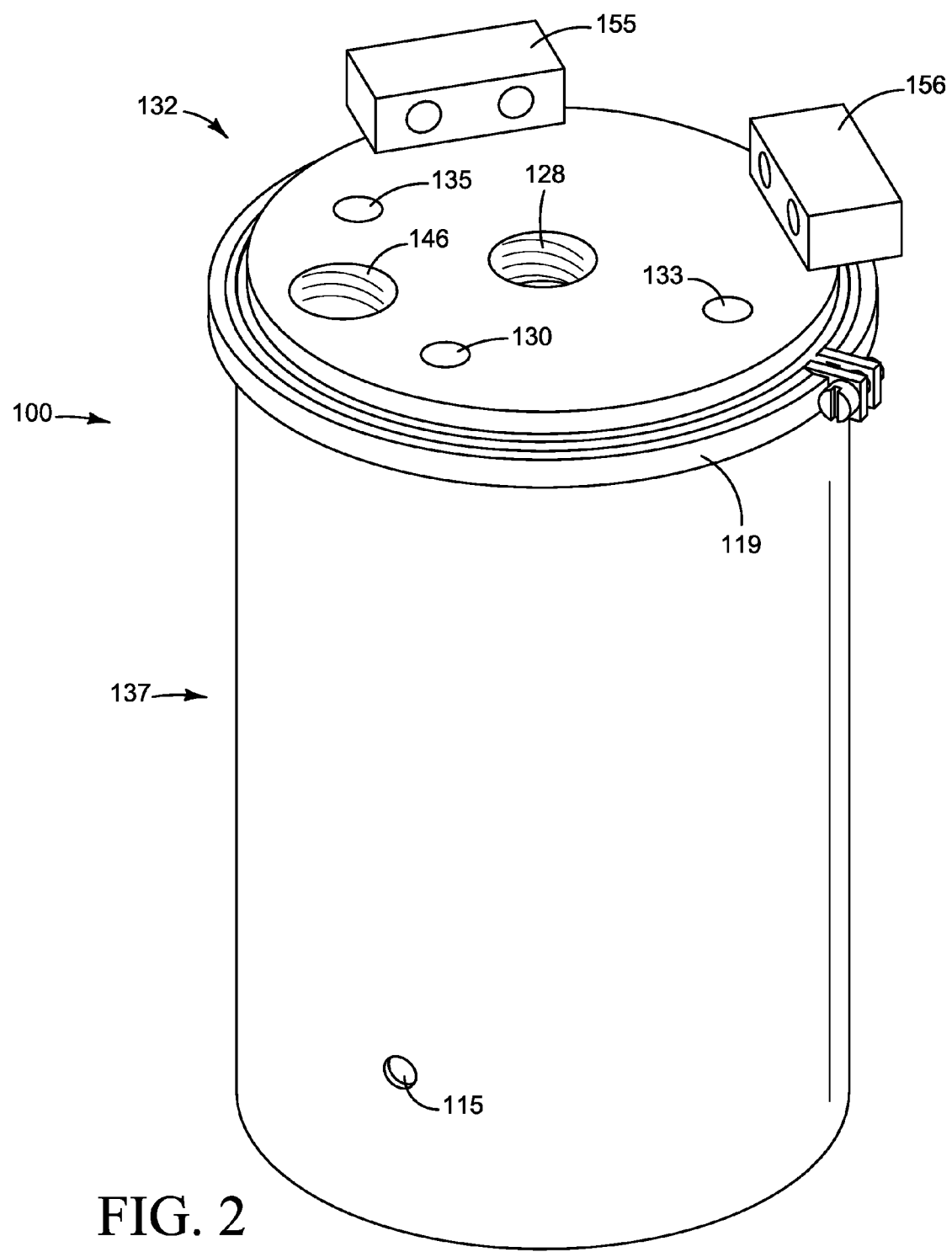
FIG. 2 is a perspective view of a second exemplary fuel airflow enriching device.
Figure 3:
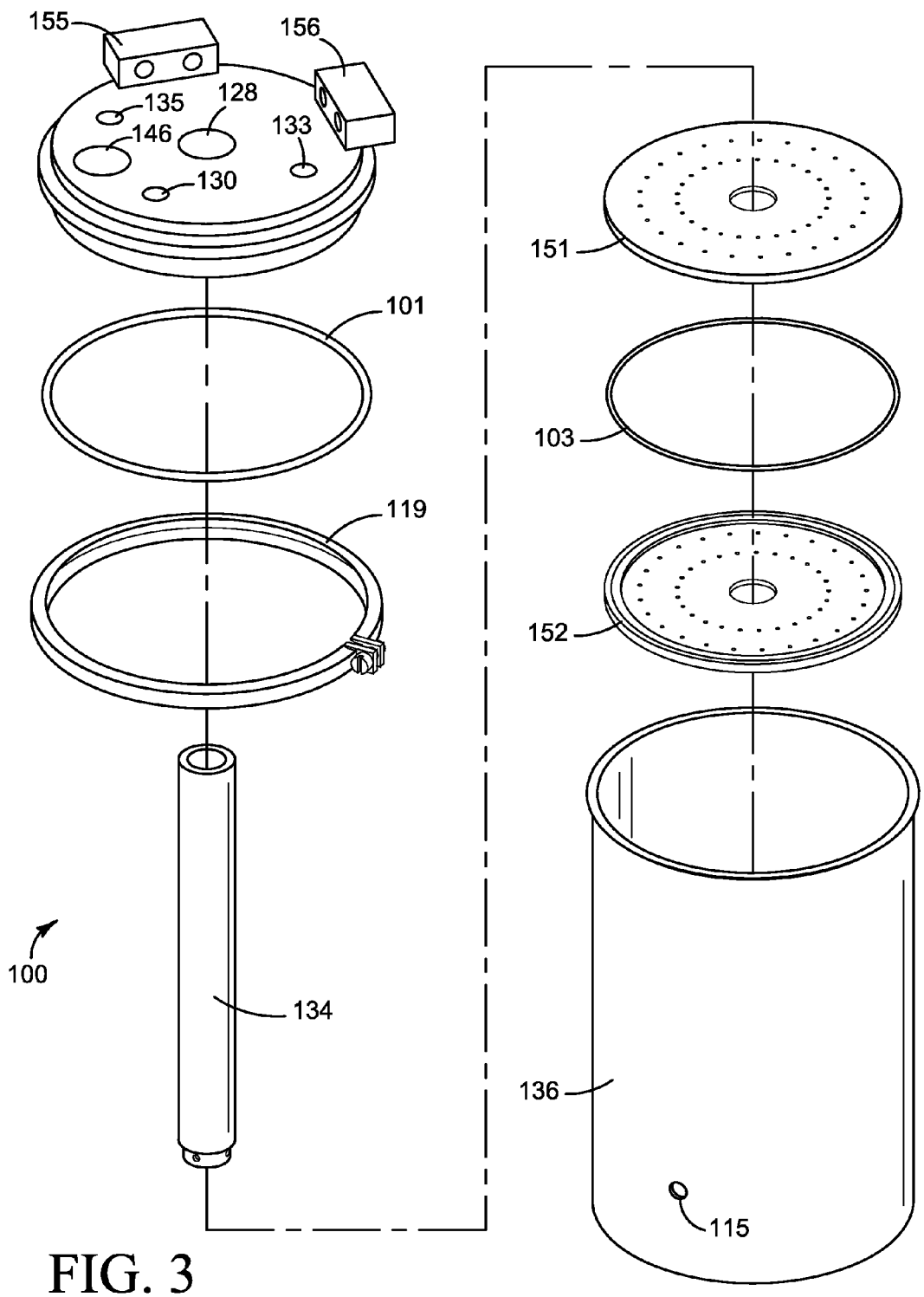
FIG. 3 is an exploded, perspective view of the second exemplary airflow enriching device of FIG. 2.
Figure 4:
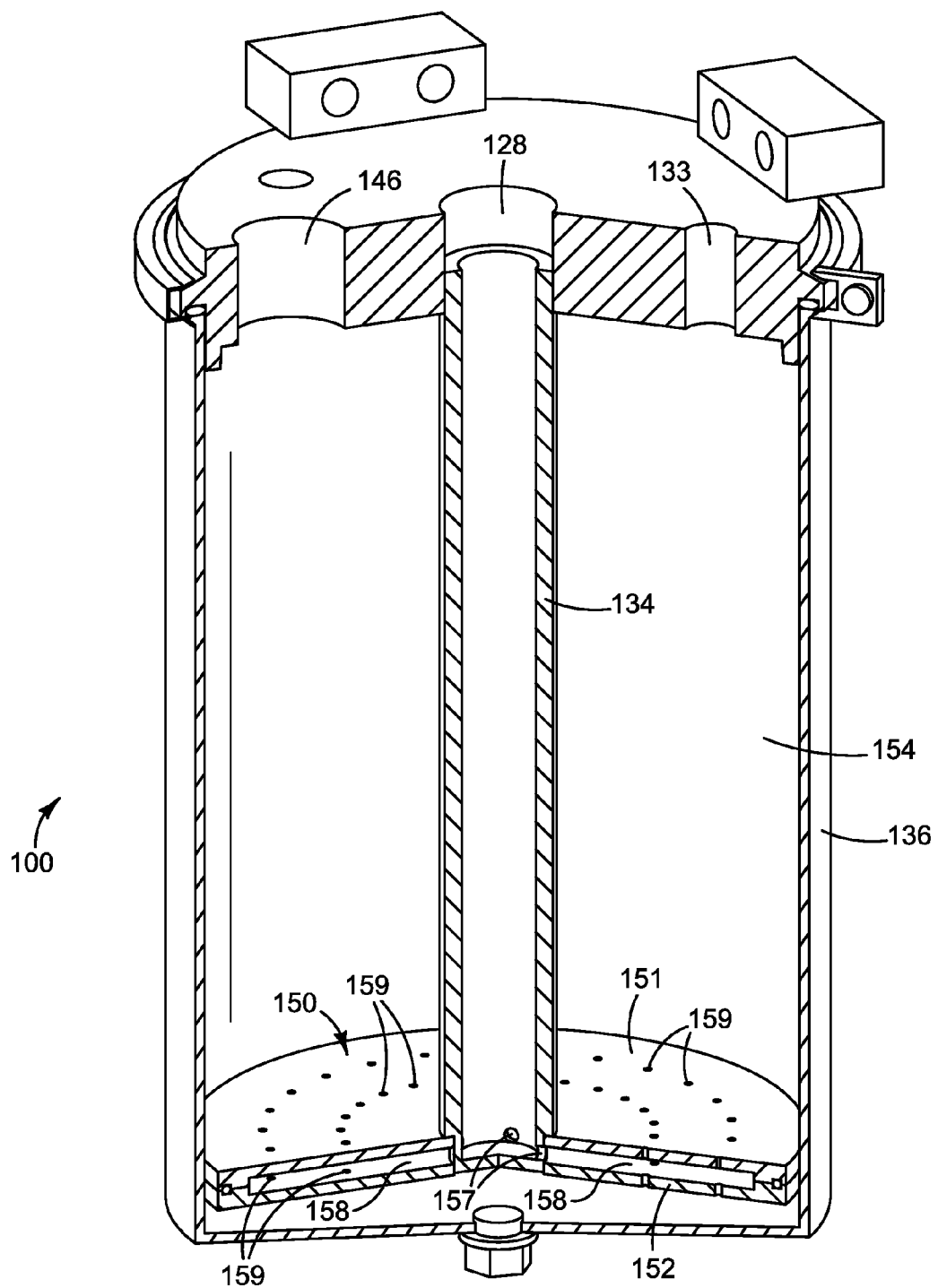
FIG. 4 is a cut-away view of the second exemplary airflow enriching device of FIG. 2.

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," "for example," and "or" and grammatically related terms indicates non-exclusive alternatives without limitation, unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise. Thus, for example, reference to "a sensor" includes two or more such sensors, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "fuel" means materials that store potential energy in forms that can be practicably released and used as heat energy, including but not limited to liquid fuels (e.g., gasoline, diesel fuel, kerosene, methanol, ethanol, biodiesel, liquefied petroleum gas, natural gas, compressed natural gas) for use in fuel burning engines, unless the context clearly dictates otherwise.

The use of "sensor" means any device that performs a measurement of its environment and transmits a signal regarding that measurement, including but not limited to air-fuel ratio meters, airflow sensors, oxygen sensors, temperature sensors, flow sensors, fluid velocity sensors, pressure sensors, optical sensors, level sensors, unless the context clearly dictates otherwise.

The use of "aerator" means a device used to inject or otherwise introduce a gas or gasses into a fluid, thereby "aerating" the fluid, including but not limited to bubble plates, bubble tubes, air stones, bubblers, and spargers, unless the context clearly dictates otherwise.

The use of "enriched airflow generator" means a device for generating a pressure differential or airflow, including but not limited to an internal combustion engine air intake, vacuum compressors, pumps, vacuum sources, vacuum pumps, vacuum cleaners, superchargers, turbochargers, fans, turbines, aspirators, vacuum tanks and other enclosed volumes from which a quantity or air has been removed, and combinations thereof, unless the context clearly dictates otherwise.

The use of "fuel injector" means a device that is used to inject either liquid fuel or a fuel-air mixture either directly into a combustion chamber of an engine or into an air stream flowing toward a combustion chamber.

The use of "vapor port injector" means a device that is used to inject vaporized fuel mixed in air directly into a combustion chamber of an engine or into an air stream flowing toward a combustion chamber, including but not limited to computer controlled, high volume/low pressure injectors.

A number of exemplary airflow enriching devices for internal combustion engines, and related methods are disclosed herein. While internal combustion engines are envisioned as the likely use of such devices, it may also be able to be used on gasoline turbine engines, rotary type engines, and with any other manner of combusting liquid fuel.

Referring initially to FIG. 1, a first exemplary airflow enriching device 10 is illustrated in general schematic format.

This exemplary airflow enriching device 10 is configured to be utilized with an internal combustion engine system. While this exemplary airflow enriching device 10 is so configured, a skilled artisan will be able to select an appropriate structure and configuration for an exemplary device in a particular embodiment based on various considerations, including the type of engine or motor with which it will be used.

In this exemplary airflow enriching device 10, a fuel tank 12 containing a supply of fuel is provided. A pump 16 is utilized to pump the fuel, preferably through a filter 14, from the fuel source (e.g., a fuel tank) 12, through a fuel inlet port 28, and to the reaction chamber 36 of the device 10. The filter 14 may be located between the fuel tank and the pump 16 (as illustrated), or the filter 14 may be located at another location between the pump 16 and the intake manifold 31 of the engine. Other means of supplying the airflow enriching device 10 with fuel are also envisioned, and many are well known to the public knowledge, including, but not limited to vacuum, gravity, etc.

The vaporization of fuel will typically result in the evaporative cooling of the fuel remaining in the reaction chamber 36. To maintain process efficiency, either incorporated into the device 10 itself or inline between the fuel tank 12 and the device 10, a heater 26 for heating the fuel may be utilized. It is preferred that the heater 26 not cause the fuel to boil, but instead keep the fuel at a temperature of between about 100° F. (38° C.) and about 130° F. (54.5° C.), more preferably about 120° F. (49° C.). Examples of heaters include, but are not limited to, a heating element located in the level of liquid fuel, an inline heater, and utilizing heat from the cooling system of the engine. It is preferred that the heating element or portion of the unit provide for a constant working temperature to enable the other elements of the unit to separate the molecular bonds that hold the hydrocarbons together. Alternatively, a heater could be wrapped around the reaction chamber. While it is preferred that the fuel not be boiled, other exemplary devices may utilize the cold boiling of the fuel.

It is preferred that the airflow enriching device 10 utilize a sensor 18 for sensing the level of fuel contained within the airflow enriching device 10. The sensor 18 measuring the level of fuel contained within the reaction chamber 36 of the airflow enriching device 10. Upon the sensor 18 detecting a level of fuel at or below a predetermined depth, the airflow enriching device 10 can, via fuel pump 16 pumping fuel through fuel inlet port 28 or other means, add fuel to the reaction chamber 36.

Attaching to the reaction chamber 36 is an air supply 24, preferably a vacuum regulated air source or a pneumatic system, for supplying a flow of air to the airflow enriching device 10. This supplied air is bubbled through the fuel contained within the reaction chamber 36 to create an enriched airflow containing fuel vapors. The enriched airflow flows out of the reaction chamber 36 through an outlet 19.

Connecting at the outlet 19 is a conduit 20, such as a supply line, for fluidly connecting the reaction chamber 36 with a vapor flow controller 25, thereby supplying enriched airflow to the vapor flow controller 25. The vapor flow controller 25 for regulating the flow of enriched airflow into the intake manifold 31 of the engine.

Referring now to FIGS. 2, 3, 4 and 5, illustrated is a second exemplary airflow enriching device 100 which could be used with the first exemplary vapor flow controller illustrated in FIGS. 6 through 15 or another exemplary vapor flow controller. In this exemplary airflow enriching device 100, a fuel tank containing a supply of fuel is provided. A pump is utilized to pump the fuel through a fuel inlet port 133, and into a reaction chamber 136. Other means of supplying the airflow enriching device 100 with fuel are also envisioned, and many are well known to the public knowledge, including, but not limited to vacuum, gravity, etc.

The illustrated reaction chamber 136 comprising a canister portion 137 and a lid portion 132. The canister portion 137 is an open topped vessel defining an internal space for holding a volume of fuel 121 having a surface level 122 therein. The lid portion 132 encloses the internal space. In the exemplary reaction chamber 136 illustrated in these figures, the lid portion 132 connects to the canister portion 137 via a clamp 119, and an O-ring 101 is utilized as a seal between the canister portion 137 and the lid portion 132. In other exemplary reaction chambers the reaction chamber could be a single piece (no separate lid portion), or otherwise configured.

In the exemplary reaction chamber 136 illustrated in these figures, the lid portion 132 comprises an air supply inlet port 128, an outlet port 146, and a number of accessory ports (e.g., sensor port 130 for receiving a sensor 131 therein, a fuel inlet port 133, an auxiliary port 135). While these ports are illustrated as being defined in the lid portion 132, in other exemplary airflow enriching devices/systems, the ports may or may not be present, and if present may located in the lid portion, in the reaction chamber, or in another location. A skilled artisan will be able to select an appropriate structure, configuration, and location for the ports in a particular embodiment based on various considerations, including the intended use of the device, the intended arena within which the device will be used, and the equipment and/or accessories with which the device is intended to be used, among other considerations.

The exemplary reaction chamber 136 of these figures further comprises mounting brackets (155, 156) for allowing the airflow enriching device 100 to be mounted within the engine compartment of the vehicle, or another location, via a suitable fastener such as a bolt. Such mounting brackets are optional, and these exemplary mounting brackets are merely one example of a possible configuration.

While the illustrated reaction chamber 136 is generally cylindrical in shape, a skilled artisan will be able to select an appropriate shape for the reaction chamber in a particular embodiment based on various considerations, including the equipment and/or accessories with which the reaction chamber is intended to be used, among other considerations.

In this exemplary reaction chamber 136, located within the reaction chamber 136 is an air supply line 134. The air supply line 134 has a first end which fluidly connects the air supply inlet port 128 which is fluidly connected to an air supply generating airflow 140. It is preferred that the airflow 140 come from a regulated source, such as a vacuum regulator 127. It is preferred that the vacuum regulator 127 be adjustable, for allowing an operator to adjust the vacuum pressure within the reaction chamber 136 and airflow enriching device 100 as desired. It is preferred that the vacuum contained within the reaction chamber 136 be maintained at no lower than 8.00 inHg (203.2 mmHg), with a more preferred range of between 8.00 inHg (203.2 mmHg) and 10.00 inHg (254 mmHg). Higher settings (higher than 10.00 inHg (254 mmHg)) and lower settings (lower than 8.00 inHg (203.2 mmHg)) are possible, but are less preferred.

The air supply line 134 has a second end which fluidly connects with an aerator 150 so that the air supply can be utilized to produce a stream of bubbles within the volume of fuel 121. In the exemplary aerator 150 illustrated, the aerator 150 comprises a top plate 151, an O-ring 103, and a bottom plate 152, the top plate 151 and the bottom plate 152 defining a chamber 158 therebetween. The O-ring 103 for sealing the connection between the top plate 151 and the bottom plate 152. While such an aerator 150 is illustrated in the drawings, a skilled artisan will be able to select an appropriate structure and configuration for an aerator in a particular embodiment based on various considerations, including the intended use of the airflow enriching device, the fuel utilized, the temperature and pressure used, and the equipment and/or accessories with which the airflow enriching device is intended to be used, among other considerations.

One or more air outlets 157 are defined through the air supply line 134 for allowing the air supply line 134 to fluidly connect with the aerator 150, for instance connecting to the chamber 158 defined between the top plate 151 and the bottom plate 152. The top plate 151 and the bottom plate 152 having a plurality of bubbler holes defined therethrough. The bubbler holes 159 for allowing the supply of air passing through the air supply line 134 and into the chamber 158 to be bubbled through the fuel 121 held within the reaction chamber 136, thereby aerating the fuel.

In use, the aerator 150 is submerged below the surface level 122 of the fuel 121. As airflow 140 passes through the aerator 150, bubbles 138 bubble out the aerator 150 and through the fuel 121, resulting in an expansion of the fuel through use of vacuum energy, creating a fuel vapors 139 (aka vaporized fuel mist, expanded fuel, atomized fuel) and an enriched airflow 160 within an air-fuel vapor mixing chamber 154. Heating the fuel (optionally) may be utilized to supplement this expansion process.

Optionally, a mist barrier (not illustrated) can be utilized within the reaction chamber to inhibit the transfer to the carburetor/fuel injection system of mist particles that have not expanded to gas. These mist particles will then settle and be later expanded into gas state. It is preferred that the mist barrier be comprised of a material that is not effected by gasoline, fuels and/or fuel additives likely to be utilized with the present invention.

As necessary, liquid fuel is supplied to the reaction chamber 136 through use of a fuel inlet port 133. A sensor 118, extending through a sensor port 115, or otherwise located, can be utilized to sense the level of fuel 121 within the reaction chamber 136, enabling additional fuel 121 to be added to the reaction chamber 136 via fuel inlet port 133, or another source, when a fuel level that is lower than a predetermined level is sensed. In this embodiment, the sensor 118 comprises an electronic sensor eye. In the exemplary reaction chamber illustrated in FIG. 2, the port 115 is defined through the sidewall of the reaction chamber 136, approximately two inches (five centimeters) above the bottom of the reaction chamber 136, and the sensor 118 is illustrated as extending through this port. Control of the level of fuel is useful to provide a minimum depth of fuel within the reaction chamber, preferably at a level at least deep enough to keep the bubbler holes 159 of the aerator 150 submerged.

The bubbles 138 and pressure cause the atomization and vaporization of the fuel 121 present within the reaction chamber 136 to form an enriched airflow 160 containing fuel vapors 139. The enriched airflow 160 leaves the reaction chamber 136 through an outlet port 146. This outlet port 146 fluidly connecting with a vapor flow controller 125 via an inlet conduit 165, thereby supplying enriched airflow 160 to the vapor flow controller 125. The vapor flow controller 125 for regulating the flow of enriched airflow into the engine, preferably the intake manifold of the engine.

Figure 5:
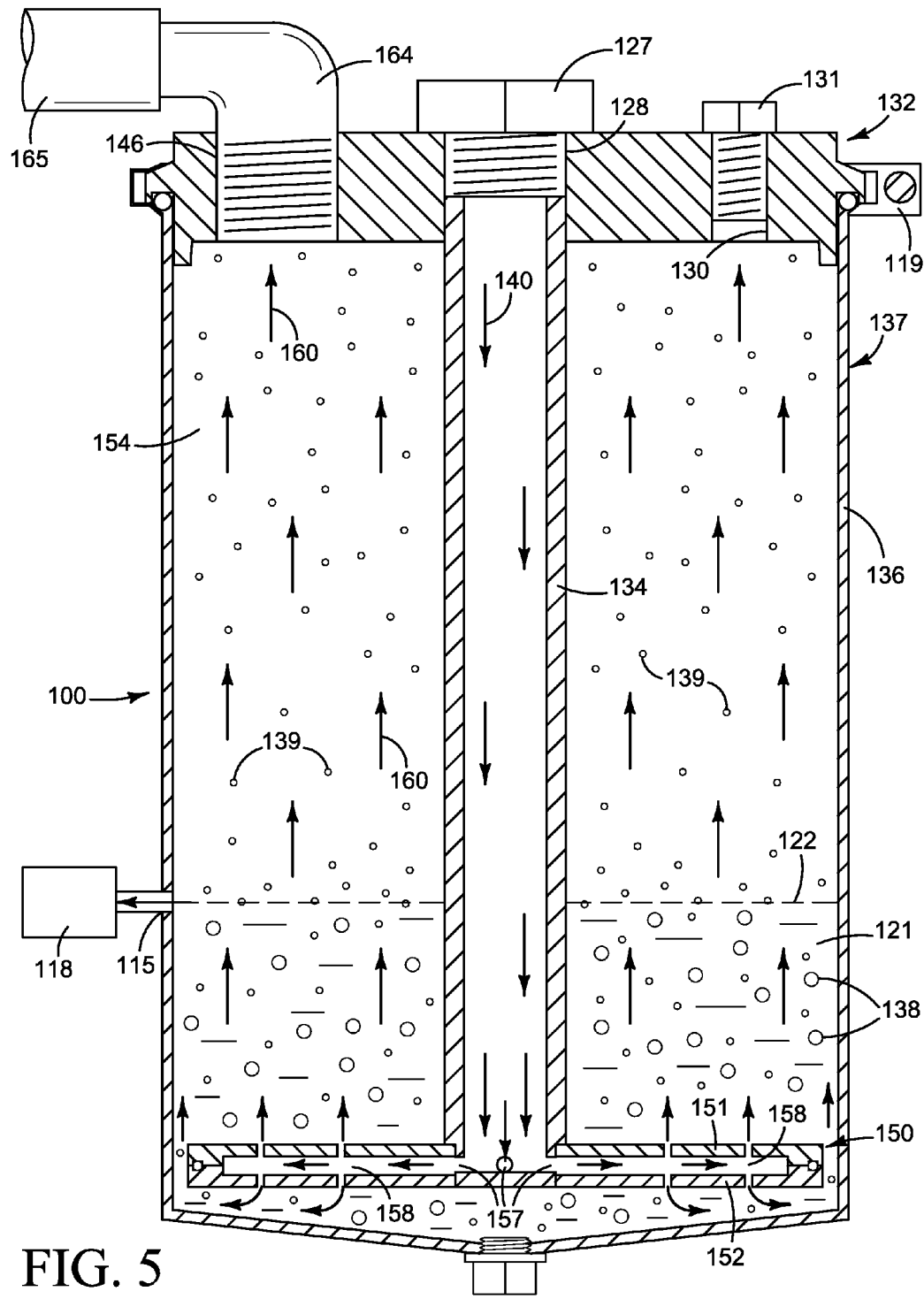
FIG. 5 is a cross-sectional view of the second exemplary airflow enriching device of FIG. 2.
Figure 6:
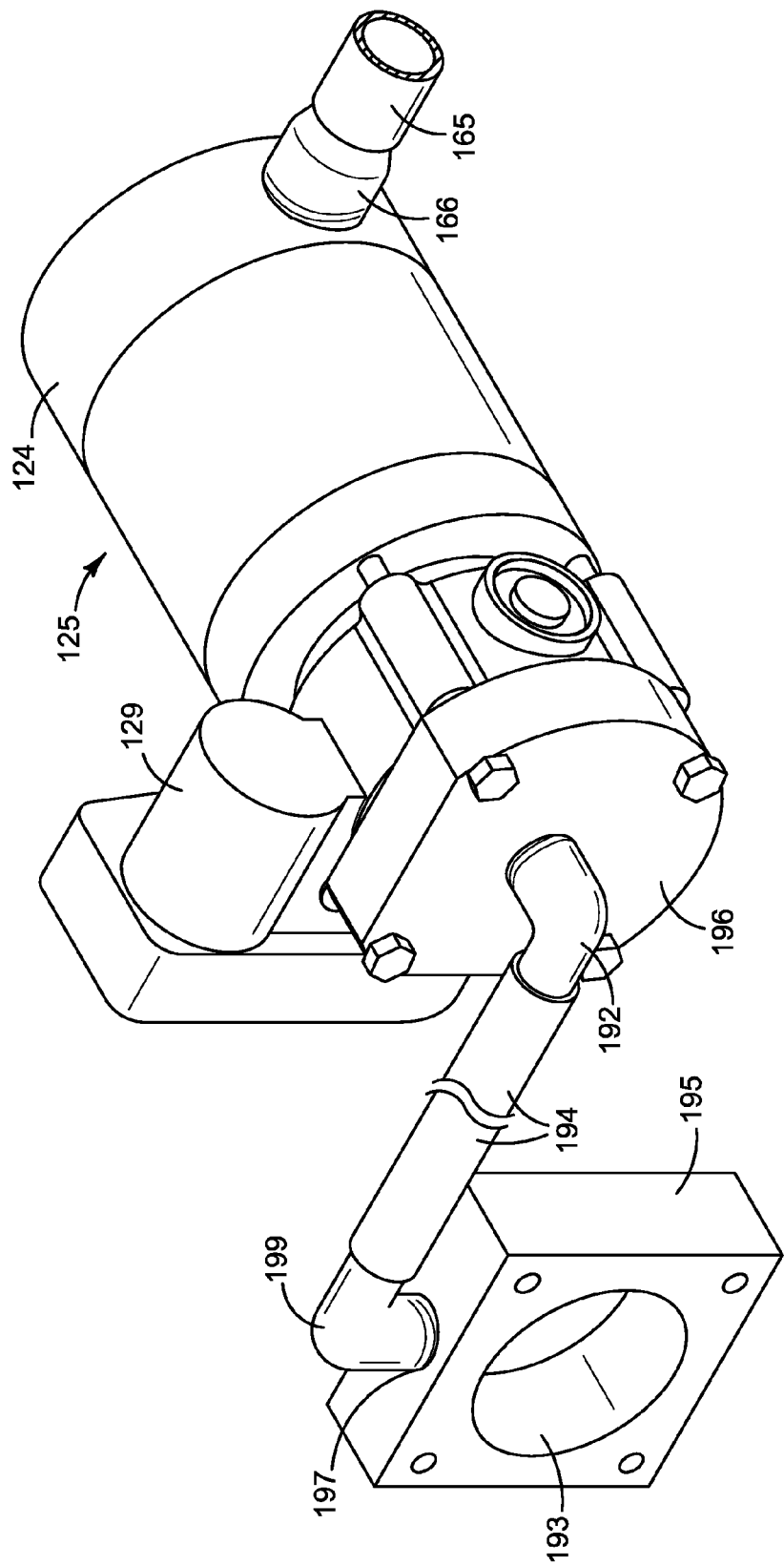
FIG. 6 is a perspective view of a first exemplary vapor flow controller.
Figure 7:
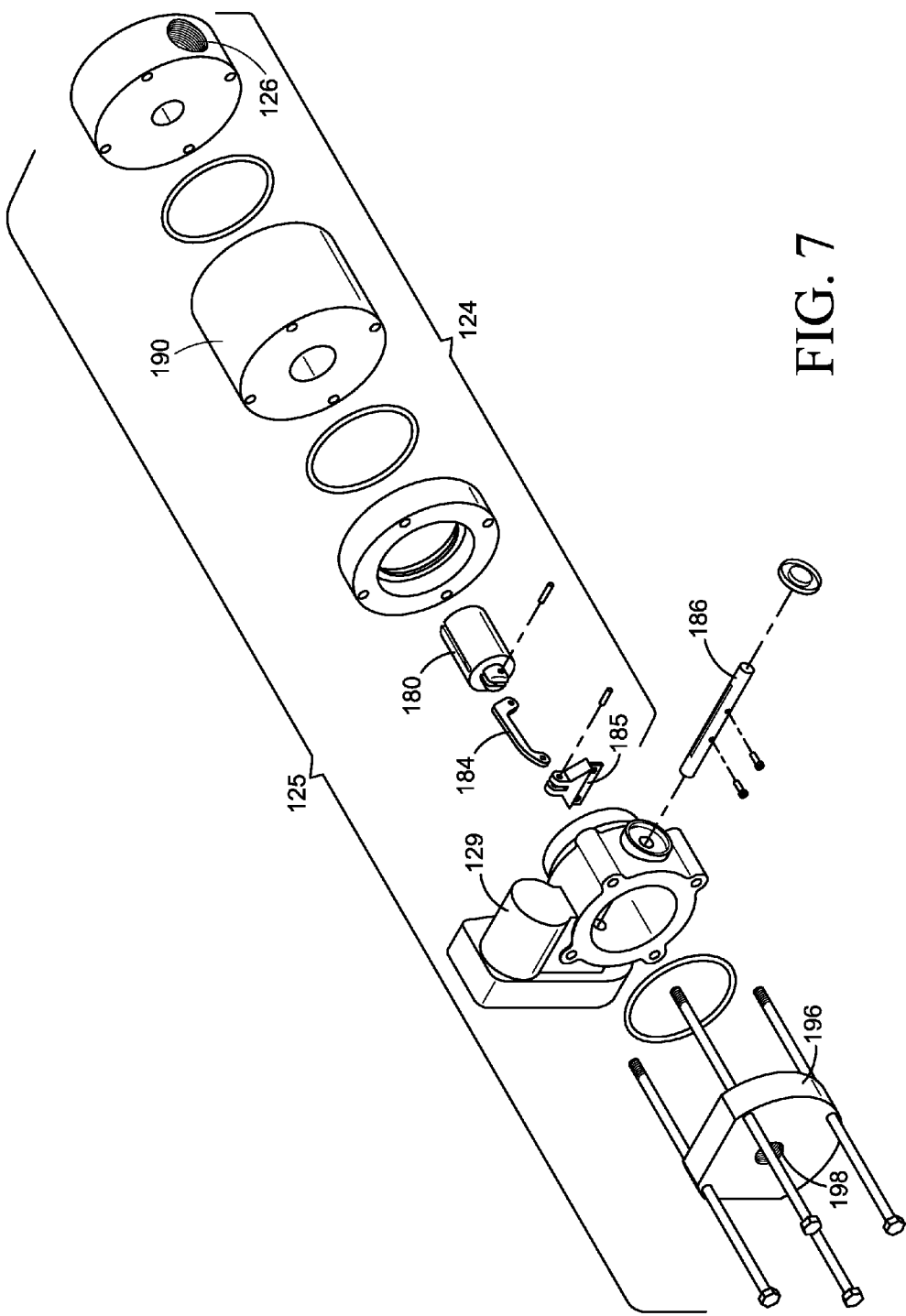
FIG. 7 is an exploded perspective view of the vapor flow controller of FIG. 6.
Figure 8:
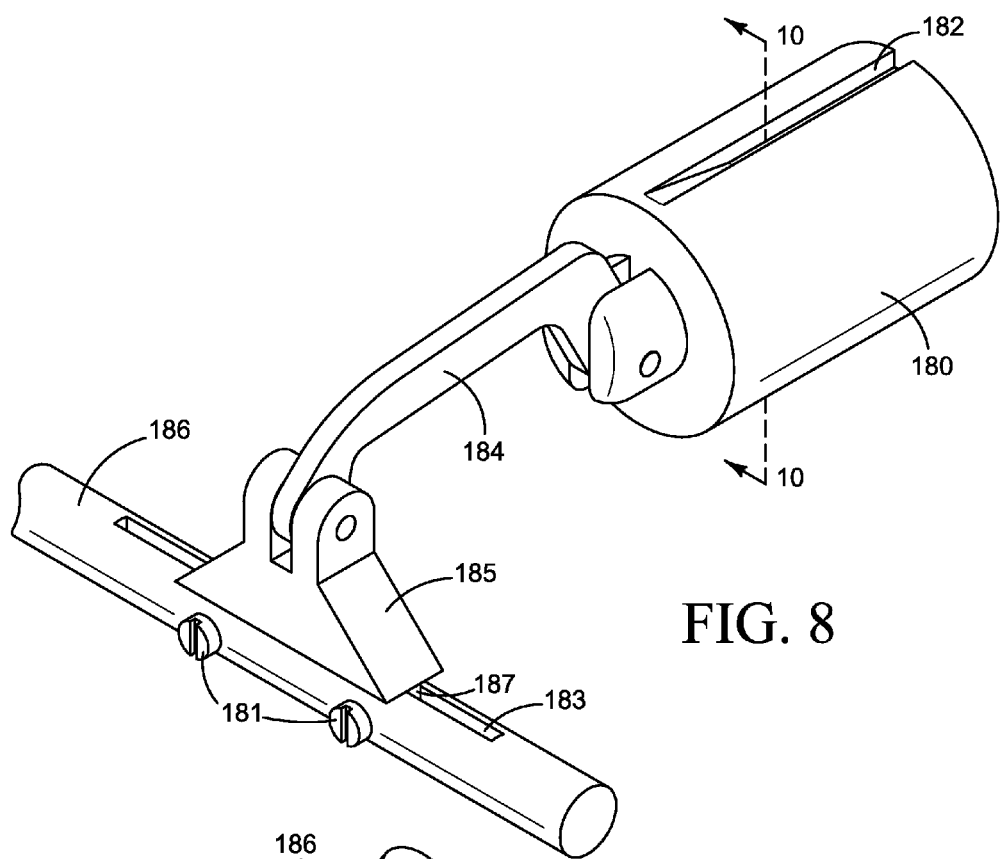
FIG. 8 is first partial, perspective view of the vapor flow controller of FIG. 7.
Figure 9:
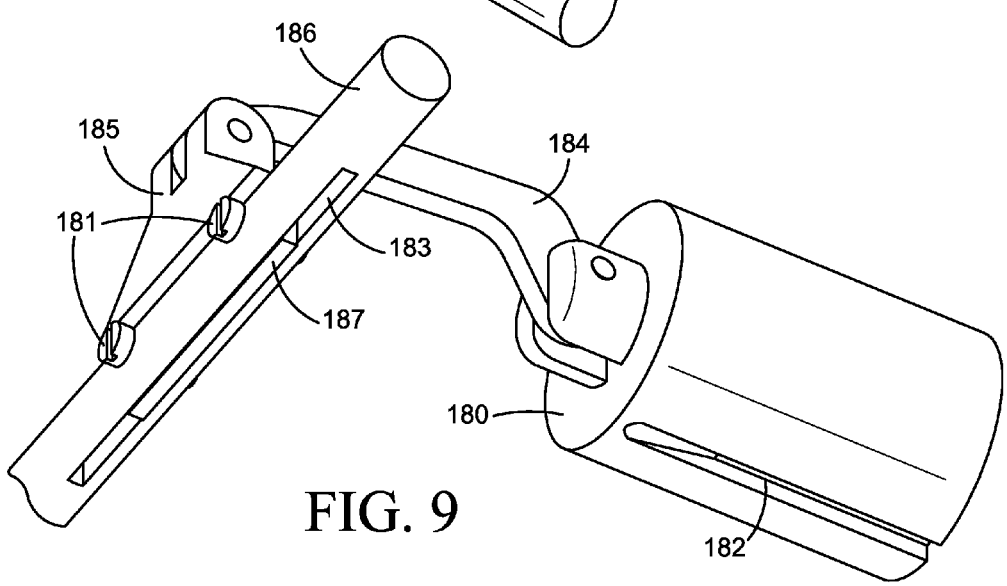
FIG. 9 is second partial, perspective view of the vapor flow controller of FIG. 7.
Figure 10:
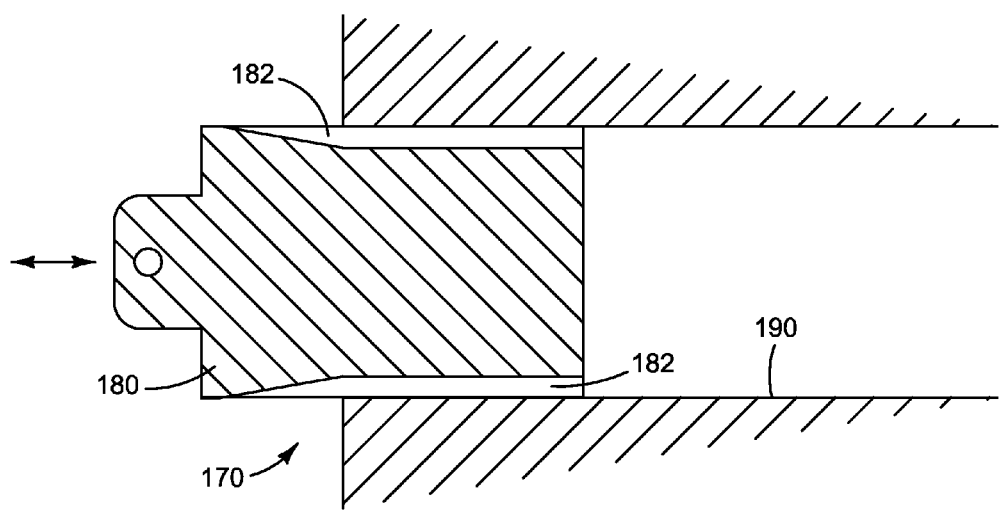
FIG. 10 is a partial, close up view of the vapor flow controller of FIG. 14.

As illustrated in FIGS. 5 and 6, the inlet conduit 165 having a first connector 164 for fluidly connecting with the outlet port 146, and a second connector 166 for fluidly connecting with the inlet port 126 of the vapor flow controller 125. While such fittings and connections are illustrated with respect to this exemplary device, a skilled artisan will be able to select an appropriate connection structure and material in a particular embodiment based on various considerations, including the intended use of the airflow enriching device, the intended arena within which the airflow enriching device will be used, and the equipment and/or accessories with which the airflow enriching device is intended to be used, among other considerations.

The vaporization of fuel may result in the evaporative cooling of the fuel remaining in the reaction chamber 136. To maintain process efficiency, either incorporated into the airflow enriching device 100 itself or inline between the fuel tank and the airflow enriching device 100, a heater for heating the fuel may be utilized, as described above regarding the exemplary airflow enriching device of FIG. 1.

Referring now to FIGS. 6 through 15, illustrated is a first exemplary vapor flow controller 125. The vapor flow controller 125 comprising a vapor flow control valve 124 and an actuator 129. The vapor flow controller 125 for controlling flow of enriched airflow 160 from the airflow enriching device 100 into the engine.

The vapor flow control valve 124 comprises an inlet port 126 which fluidly connects with the reaction chamber 136 via inlet conduit 165. The vapor flow control valve 124 further comprising a passageway 190 extending between the inlet port 126 and an outlet port 198. The outlet port 198 fluidly connects with an outlet conduit 194 (such as via outlet connector 192) for supplying the enriched airflow 160 to the engine. For instance, as illustrated in FIG. 6, a throttle body spacer 195 could be provided, the throttle body spacer 195 comprising an inlet port 197 therethrough into an internal passage 193. A connector 199 or other fitting could be used to fluidly connect the outlet conduit 194 with the inlet port 197. The throttle body spacer 195 configured for attachment to the engine's air-intake system, for instance, downstream of the throttle body between the intake manifold and throttle body, or upstream of the throttle body. A skilled artisan will be able to select an appropriate location for the throttle body spacer 195 or other manner of fluidly connecting the airflow enriching device 100 with the engine's air-intake system in a particular embodiment based on various considerations, including the equipment and/or accessories with which the airflow enriching device 100 is intended to be used, among other considerations.

The vapor flow control valve 124 further comprising a valve 170 for interrupting the passageway 190, enabling the flow of enriched airflow 160 to be turned on, increased, decreased, and turned off.

In the exemplary vapor flow controller 125 illustrated in the figures, the valve 170 comprises a piston 180 which is in slidable engagement with the passageway 190. While this type of valve is illustrated herein, a skilled artisan will be able to select an appropriate structure, type and configuration for the valve in a particular embodiment based on various considerations, including the intended use of the valve, among other considerations, including but not limited to plug valves, piston valves, ball valves, gate valves, globe valves, needle valves, stopcock valves, spool valve, and butterfly valves.

The piston 180 configured for slidably engaging the passageway 190. The piston 180 having an external surface comprising at least one lateral groove 182 defined therein.

Figure 11:
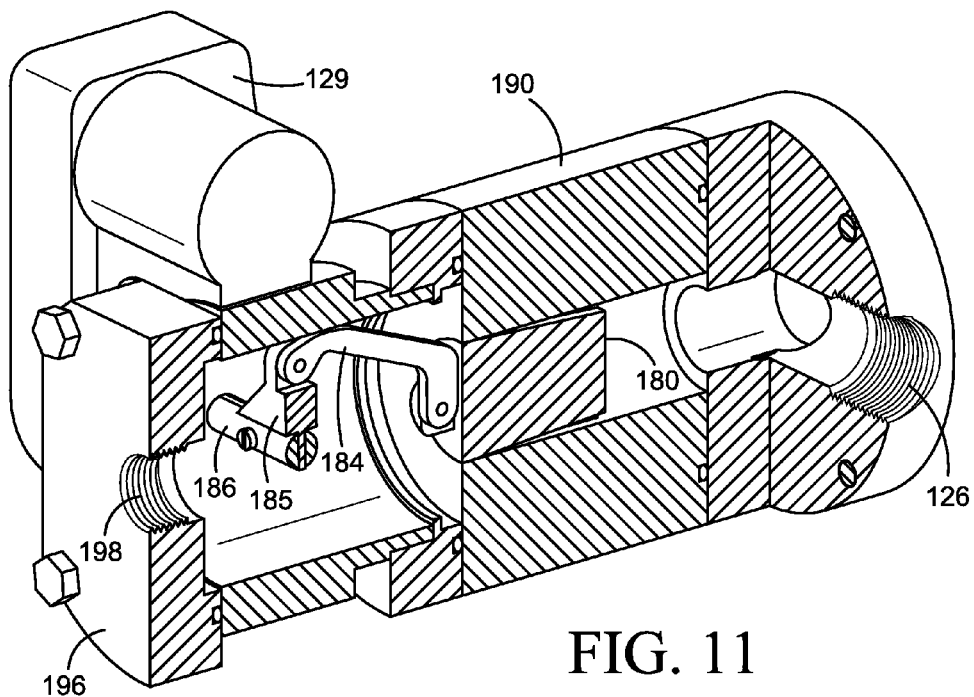
FIG. 11 is a first partial, cross-sectional, perspective view of the vapor flow controller of FIG. 6.
Figure 12:
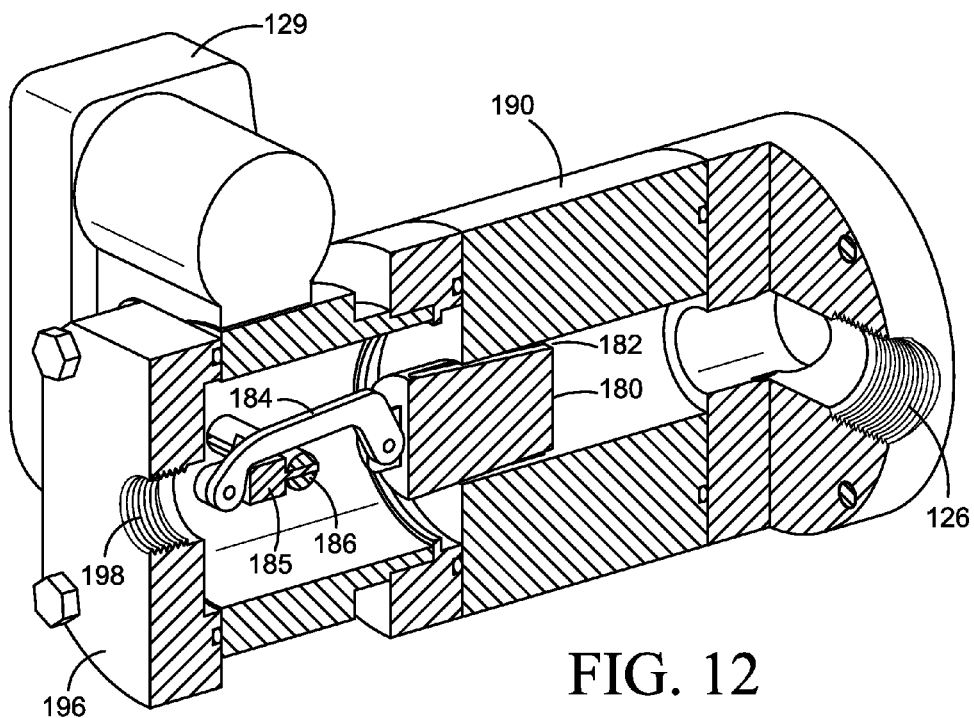
FIG. 12 is a second partial, cross-sectional, perspective view of the vapor flow controller of FIG. 6.
Figure 13:
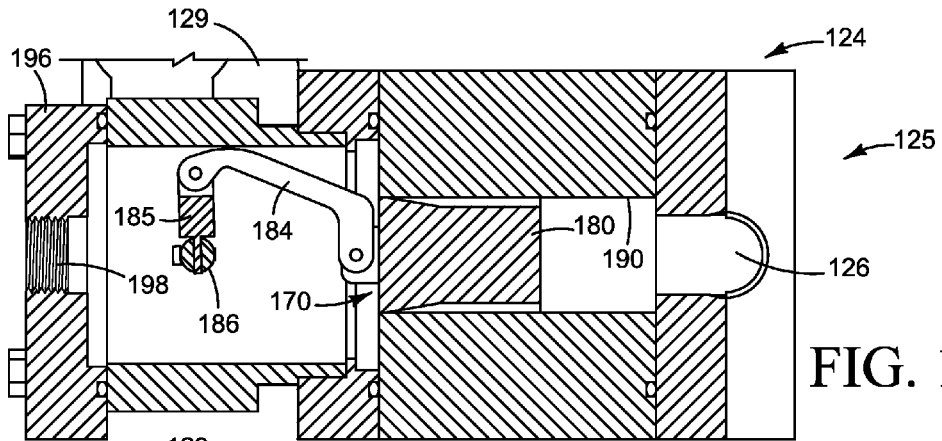
FIG. 13 is a first cross-sectional view of the vapor flow controller of FIG. 6.
Figure 14:
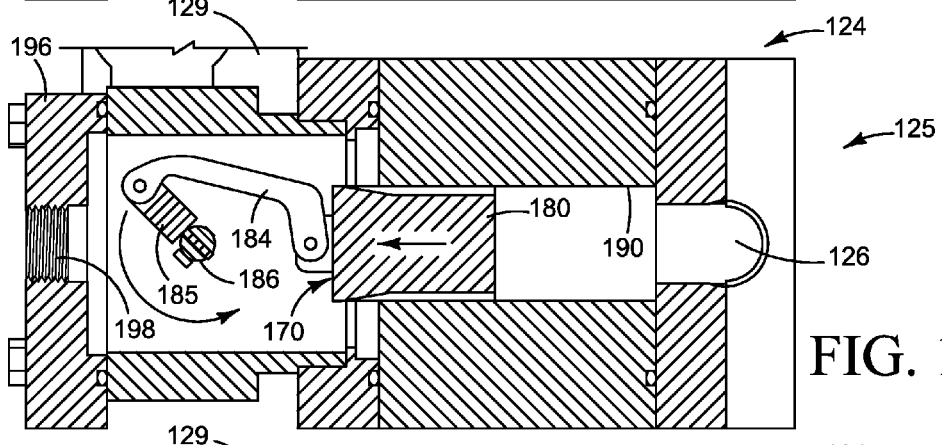
FIG. 14 is a second cross-sectional view of the vapor flow controller of FIG. 6.
Figure 15:
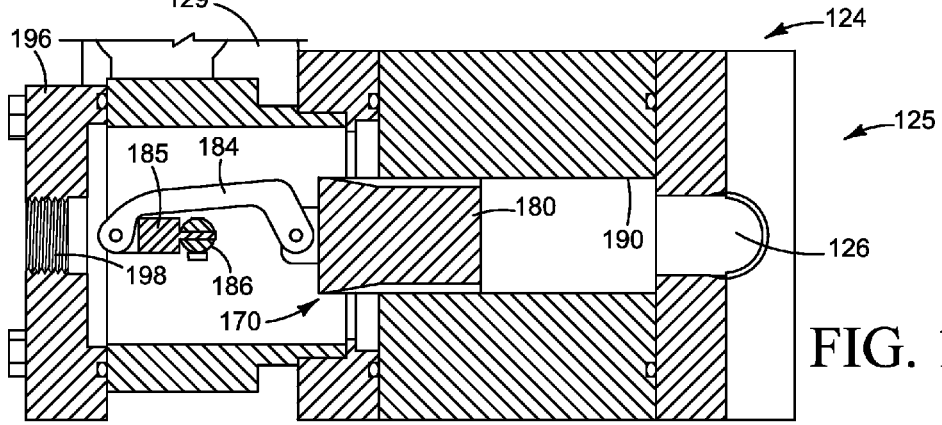
FIG. 15 is a third cross-sectional view of the vapor flow controller of FIG. 6.

The valve 170 having a closed position which is illustrated in FIGS. 11 and 13, and open positions which are illustrated in FIGS. 12, 14 and 15. In the closed position, the piston 180 is inserted into the passageway 190 thereby stopping up the passageway 190. In the open positions, the piston 180 is withdrawn from the passageway 190 so that one or more of the lateral grooves 182 are exposed, enabling enriched airflow 160 to pass from one side of the valve 170 to the other side of the valve.

In the exemplary vapor flow controller 125 illustrated in these figures, the piston 180 is moved from the closed position to the open positions (and back to the closed position) through use of the actuator 129. The exemplary actuator 129 illustrated in the figures having a rotatable shaft 186. The piston 180 connecting to the actuator 129 via an arm 184 connecting to the shaft 186. The actuator 129 rotates the shaft 186, which is translated into lateral motion of the piston 180 via the arm 184, moving the piston 180 from the open position to the closed position (and vice versa). It is preferred that the piston 180 be hingedly connected to a first end of the arm 184 and that the shaft 186 be hingedly connected to a second end of the arm 184.

The opening and closing of the valve 170 serves to vary the pressure within the airflow enriching device 100, and allows (in the open positions) enriched airflow 160 to be drawn into the engine. The actuator 129 further comprising an outlet port 198 defined in an end plate 196, the outlet port 198 configured for fluid connection with the engine. For instance, the outlet port 198 could connect, via a conduit 194, to a connector attached in-line with the intake manifold (for instance, between the intake manifold and the throttle body), thereby enabling enriched airflow 160 to be drawn into the intake manifold of the engine. While this is one such manner of feeding the enriched airflow into the engine, a skilled artisan will be able to select an appropriate structure and material for the connection in a particular embodiment based on various considerations, including the intended use of the airflow enriching device, the intended arena within which the airflow enriching device will be used, and the equipment and/or accessories with which the airflow enriching device is intended to be used, among other considerations.

In engines utilizing a fuel injection system (a "fuel injected engine"), the "throttle body" is the part of the air intake system that controls the amount of air flowing into the engine, typically in response to driver accelerator pedal input in the main. The throttle body is usually located between the air filter box and the intake manifold. A throttle body is somewhat analogous to the carburetor in a non-fuel injected engine. A typical throttle body will have a rotatable shaft connected to a throttle plate, comprising a butterfly valve that regulates the airflow. Typically, accelerator pedal motion is utilized to determine how much the throttle body's butterfly valve should be open, allowing more (or less) air into the intake manifold.

It is preferred that the actuator 129 comprise a throttle body which is the same as, or is similar to, the existing engine throttle body, such a throttle body electronically controlled by the vehicle's computer system. It is further preferred that the actuator 129 be electronically connected into the vehicle's electrical and computing systems in parallel with the existing throttle body, so that the two components work in tandem. For instance, a split connector, a Y-splitter, or other wiring connection could be used to electronically connect the throttle body and actuator 129 in parallel.

In the exemplary airflow enriching device 100 illustrated in FIGS. 6 through 15, the actuator 129 can comprise the same or similar make and model of throttle body already being used on the engine. Such a throttle body being converted for use in the vapor flow controller 125 by connecting the vapor flow controller 125 to one side, and an end plate 196 to the other end. The outlet port 198 is preferably defined through the end plate 196.

The butterfly valve portion of the throttle body would be removed from the shaft 186. In this exemplary throttle body, the shaft 186 comprises a channel 183 therein to which the butterfly valve portion connects. The butterfly valve portion is replaced with a suitable connector, such as connector 185 having a tongue 187 for insertion into the channel 183. At least one fastener 181 utilized to fix the tongue 187 into the channel 183. The connector 185 pivotally attached to the arm 184, which is in turn pivotally attached to the piston 180.

In such a configuration, in response to positive driver accelerator pedal input in the main, the throttle body opens and the actuator would be actuated at the same time, preferably to the same degree, thereby allowing more air to flow into the engine, including enriched airflow 160 from the airflow enriching device 100.

It is preferred that a vacuum be maintained within the airflow enriching device 100, preferably along with the presence of heat energy, to help pull apart the hydrocarbon molecular bonds of the fuel and let molecules of fuel to become usable expanded fuel (fuel vapors 139). The vapor flow controller 125 and the vapor flow control valve 124 regulate the vacuum and provide for proper air-fuel ratio to be introduced into the engine's combustion chamber.

It is preferred that the vacuum (and preferably heat energy) is used to pull the hydrocarbon bonds apart and let oxygen into the molecular chain to become a more useable form of fuel. The fuel that is created is a lighter, more explosive type of fuel. The product(s) created by one or more of these processes is also deemed included in this disclosure.

The aerator 150 introduces small air bubbles into the liquid fuel that start the expansion process. As the air bubbles 138 enter the fuel 121, the vacuum quickly expands the bubbles 138 and breaks them. While this is happening, the fuel 121 becomes activated and the molecular bonds are being separated. The vacuum is being maintained in the reaction chamber 136 by the vapor flow control valve 124 of the vapor flow controller 125. The vapor flow controller 125 provides a suitable control on the vacuum pressure in the reaction chamber 136, and provides a control on the internal combustion engines operating RPM.

In the second illustrated exemplary airflow enriching device 100, the vacuum energy that is present in the reaction chamber 136 is created through use of an enriched airflow generator, for instance where the airflow enriching device 100 connects with the engine of a vehicle, the vehicle's vacuum system could be utilized, or additional vacuum compressors or other such vacuum sources could be added to the system to create the vacuum present.

Figure 16:
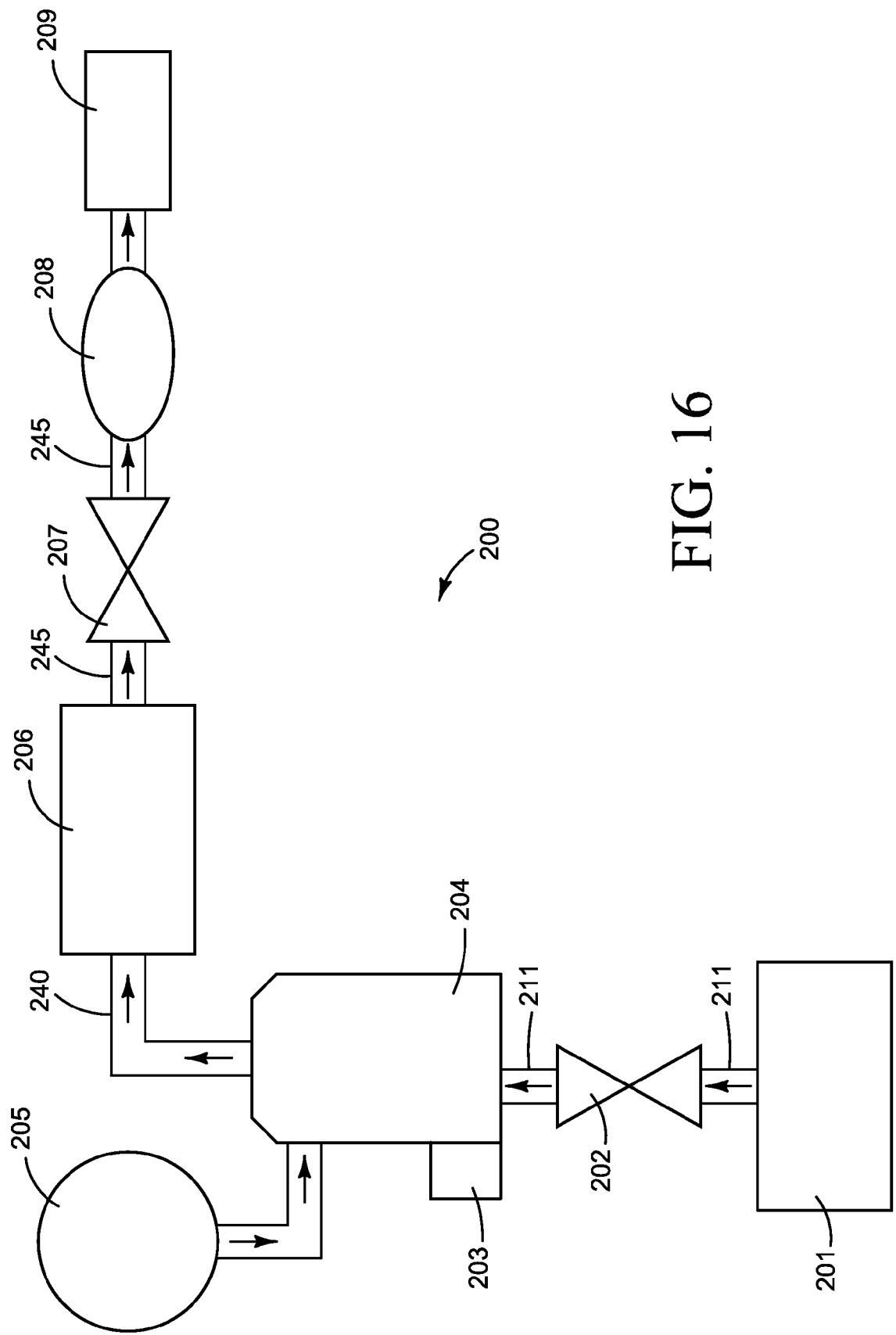
FIG. 16 is a schematic representation of a third exemplary airflow enriching device.

A third exemplary airflow enriching device 200 is schematically illustrated in FIG. 16. The airflow enriching device 200 connects with a fuel source 201 (e.g., a fuel tank) for supplying fuel via a fuel line 211. Preferably, a valve 202 is connected between the fuel source 201 and the airflow enriching device 200 for allowing the supply of fuel to be turned on/off as needed. A pump (not illustrated) can be provided, if desired, for instance within the fuel source 201, in-line with the fuel line 211, etc.

The fuel being supplied to a reaction chamber 204. Optionally, an ultrasonic vaporizer, as described with respect to the fifth exemplary airflow enriching device 400 below, could also be utilized. The reaction chamber 204 containing a level of fuel therein, the level being controlled by an electronic fuel level control 203 or other sensor. The reaction chamber 204 for generating an enriched airflow 240 for combustion in the engine 209.

Preferably, a vacuum regulator 205 connects with the reaction chamber 204 for regulating the vacuum in the reaction chamber 204, for keeping it at a desired pressure level, thereby assisting in controlling the expansion of the fuel. It is preferred that the vacuum regulator 205 be adjustable, allowing the desired pressure level within the airflow enriching device 200 to be adjusted, as desired. The vacuum regulator 205 preferably serving as the source of the airflow in the airflow enriching device 200.

The airflow enriching device 200 preferably further comprising an enriched airflow generator 206 for producing a pressure differential in the enriched airflow 240 and generating a compressed enriched airflow 245. The enriched airflow generator 206 preferably creating a pressure differential within the airflow enriching device 200, drawing airflow through the vacuum regulator 205 and into the reaction chamber 204 to create the enriched airflow 240. The enriched airflow generator 206 can be powered by any means, included but not limited to via a belt driven by the engine. In other exemplary airflow enriching devices, an enriched airflow generator may or may not be utilized.

It is preferred that the output of compressed enriched airflow 245 from the enriched airflow generator 206 be interrupted by a vapor flow controller 207. The vapor flow controller 207 for regulating the flow of compressed enriched airflow 245 into the engine 209. The vapor flow controller 207 fluidly connecting with the engine 209 via a vapor input adapter 208. One exemplary vapor input adapter 208 comprising a throttle body spacer for connecting between the vehicle's intake manifold and the throttle body. While this is one manner of fluidly connecting the airflow enriching device to the vehicle's engine, a skilled artisan will be able to select an appropriate structure and configuration for the connection in a particular embodiment based on various considerations, including the equipment and/or accessories with which the vehicle is already configured, among other considerations.

Figure 17:
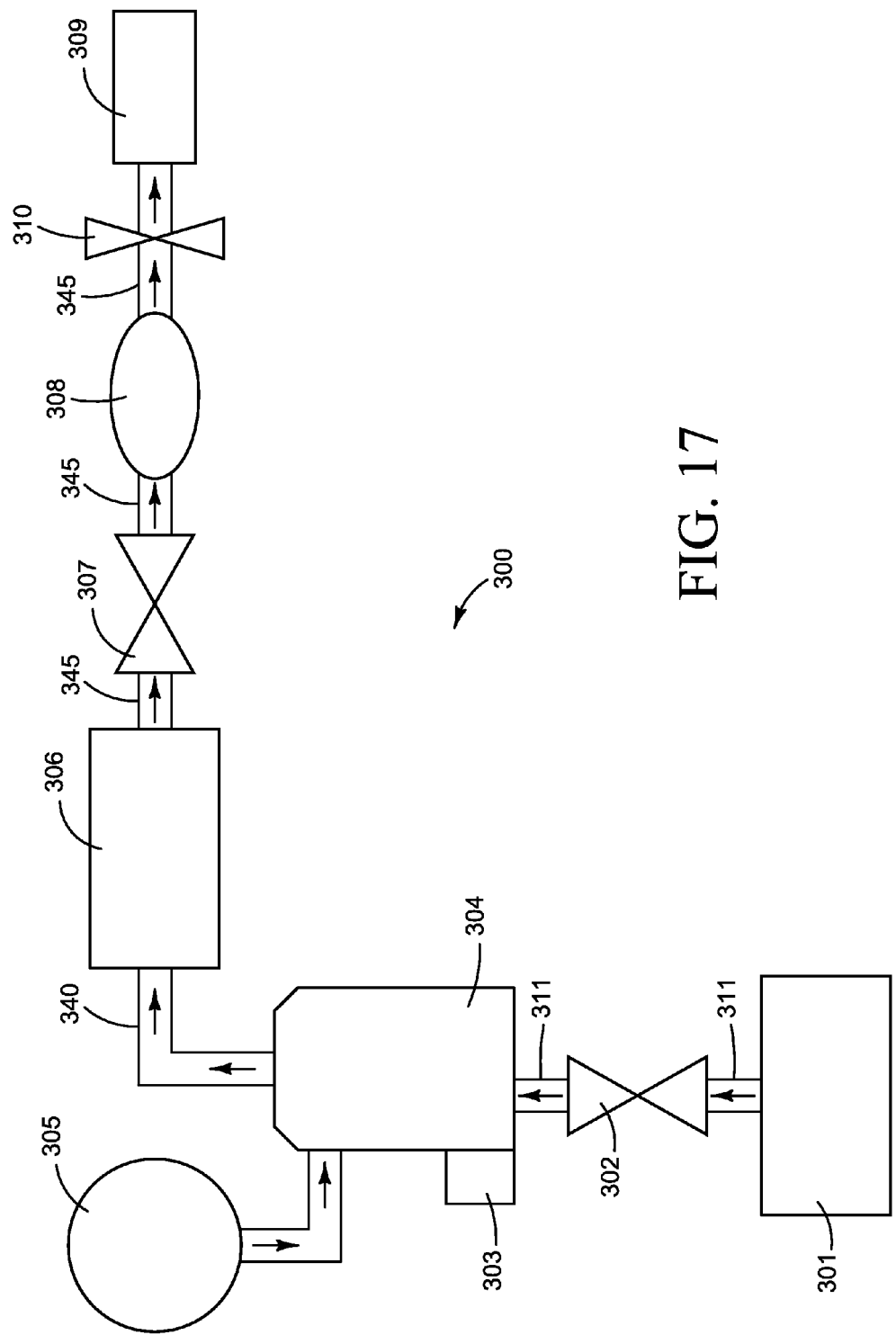
FIG. 17 is a schematic representation of a fourth exemplary airflow enriching device.

In a fourth exemplary airflow enriching device 300, schematically illustrated generally in FIG. 17, the airflow enriching device 300 is configured for use with an engine utilizing fuel injection. FIG. 17 illustrates the airflow enriching device 300 connecting with a fuel source 301 for supplying fuel via a fuel line 311. Preferably, a valve 302 is connected between the fuel source 301 and the airflow enriching device 300 for allowing the supply of fuel to be turned on/off as needed. A pump (not illustrated) can be provided, if desired, for instance within the fuel source 301, in-line with the fuel line 311, etc.

The fuel being supplied to a reaction chamber 304. Optionally, an ultrasonic vaporizer, as described with respect to the fifth exemplary airflow enriching device 400 below, could also be utilized. The reaction chamber 304 containing a level of fuel therein, the level being controlled by an electronic fuel level control 303 or other sensor. The reaction chamber 304 for generating an enriched airflow 340 for combustion in the engine 309.

Preferably, a vacuum regulator 305 connects with the reaction chamber 304 for regulating the vacuum in the reaction chamber 304, for keeping it at a desired pressure level, thereby assisting in controlling the expansion of the fuel. It is preferred that the vacuum regulator 305 be adjustable, allowing the desired pressure level to be adjusted, as desired. The vacuum regulator 305 preferably serving as the source of the airflow in the airflow enriching device 300. In other exemplary airflow enriching devices, an enriched airflow generator may or may not be utilized.

The airflow enriching device 300 preferably further comprising an enriched airflow generator 306 for producing a pressure differential in the enriched airflow 340 and generating a compressed enriched airflow 345. The enriched airflow generator 306 preferably creating the pressure differential in the airflow enriching device 300, drawing airflow through the vacuum regulator 305 and into the reaction chamber 304 to create the enriched airflow 340. The enriched airflow generator 306 can be powered by any means, included but not limited to via a belt driven by the engine.

It is preferred that the output of compressed enriched airflow 345 from the enriched airflow generator 306 be interrupted by a vapor flow controller 307. The vapor flow controller 307 for regulating the flow of compressed enriched airflow 345 into the engine 309.

In this exemplary airflow enriching device 300, the vapor flow controller 307 is fluidly connected with the engine 309 via a vapor input adapter 308. One exemplary vapor input adapter 308 comprising a throttle body spacer for connecting between the vehicle's intake manifold and the throttle body. While this is one manner of fluidly connecting the airflow enriching device to the vehicle's engine, a skilled artisan will be able to select an appropriate structure and configuration for the connection in a particular embodiment based on various considerations, including the equipment and/or accessories with which the vehicle is already configured, among other considerations.

Also, or in alternative to the use of a vapor input adapter 308 for inputting the enriched airflow 345 into the intake manifold, the airflow enriching device 300 could utilize vapor port injectors 310 for injecting the enriched airflow 345 into the fuel rail 310 of the fuel injector system. Thus, either the vapor input adapter 308 and/or the fuel rail 310 could be absent in a particular exemplary airflow enriching device 300.

Figure 18:
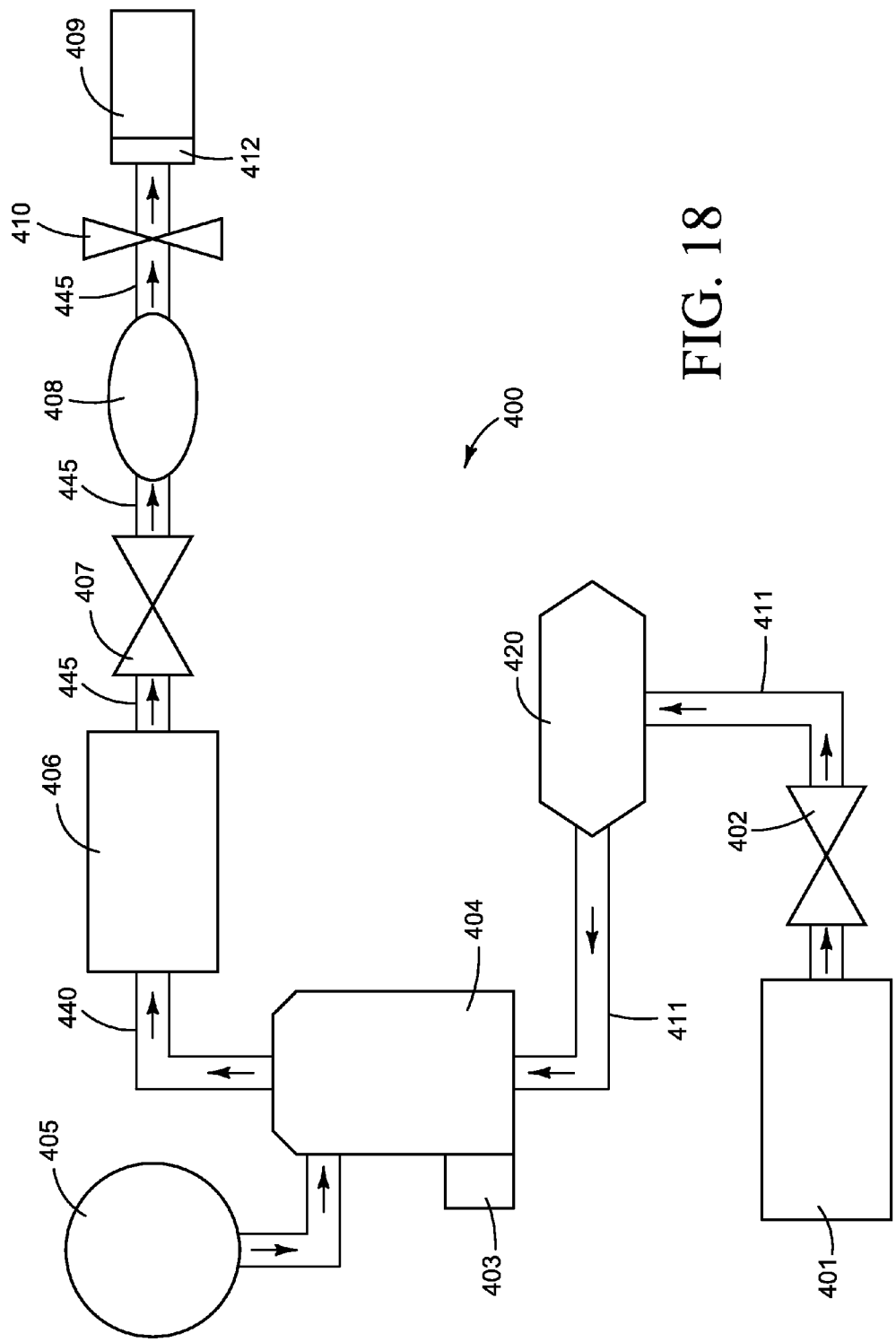
FIG. 18 is a schematic representation of a fourth exemplary airflow enriching device.

In a fifth exemplary airflow enriching device 400, schematically illustrated generally in FIG. 18, the airflow enriching device 400 connects with a fuel source 401 for supplying fuel via a fuel line 411. Preferably, a valve 402 is connected between the fuel source 401 and the airflow enriching device 400 for allowing the supply of fuel to be turned on/off as needed. A pump (not illustrated) can be provided, if desired, for instance within the fuel source 401, in-line with the fuel line 411, etc.

It is preferred that the airflow enriching device 400 include an ultrasonic vaporizer 420, for instance, located in-line between the valve 402 and the reaction chamber 404, or otherwise connected to or integrated into the reaction chamber 404. The ultrasonic vaporizer 420 for applying ultrasonic waves to the airflow enriching device 400, the fuel and/or reaction chamber 404 for facilitating the fuel expansion and/or vaporization processes of the airflow enriching device, resulting in higher vapor concentration and flow rates for displacement motors.

For instance, the ultrasonic vaporizer 420 could convert the liquid fuel into a heavy vapor containing small, atomized particles of fuel. This heavy vapor is then supplied to the reaction chamber 404 for expansion, recreating the enriched airflow. Utilization of such an ultrasonic vaporizer 420 will help keep the size of the expansion chamber as small as possible. One exemplary ultrasonic vaporizer is operated by 12 volt current. A skilled artisan will be able to select an appropriate ultrasonic vaporizer in a particular embodiment based on various considerations, including the intended use of the airflow enrichment device, and the equipment and/or accessories with which the airflow enrichment device is intended to be used, among other considerations.

The fuel being supplied to a reaction chamber 404. The reaction chamber 404 containing a level of fuel therein, the level being controlled by an electronic fuel level control 403 or other sensor. The reaction chamber 404 for generating an enriched airflow 440 for combustion in the engine 409.

Preferably, a vacuum regulator 405 connects with the reaction chamber 404 for regulating the vacuum in the reaction chamber 404, for keeping it at a desired pressure level, thereby assisting in controlling the expansion of the fuel. It is preferred that the vacuum regulator 405 be adjustable, allowing the desired pressure level to be adjusted, as desired. The vacuum regulator 405 preferably serving as the source of the airflow in the airflow enriching device 400. In other exemplary airflow enriching devices, an enriched airflow generator may or may not be utilized.

The airflow enriching device 400 preferably further comprising an enriched airflow generator 406 for producing a pressure differential in the enriched airflow 440 and generating a compressed enriched airflow 445. The enriched airflow generator 406 preferably creating pressure differential in the airflow enriching device 400, drawing airflow through the vacuum regulator 405 and into the reaction chamber 404 to create the enriched airflow 440. The enriched airflow generator 406 can be powered by any means, included but not limited to via a belt driven by the engine.

It is preferred that the output of compressed enriched airflow 445 from the enriched airflow generator 406 be interrupted by a vapor flow controller 407. The vapor flow controller 407 for regulating the flow of compressed enriched airflow 445 into the engine 409. The vapor flow controller 407 fluidly connecting with the engine 409 via a vapor input adapter 408. One exemplary vapor input adapter 408 comprising a throttle body spacer for connecting between the vehicle's intake manifold and the throttle body. While this is one manner of fluidly connecting the airflow enriching device to the vehicle's engine, a skilled artisan will be able to select an appropriate structure and configuration for the connection in a particular embodiment based on various considerations, including the equipment and/or accessories with which the vehicle is already configured, among other considerations.

Preferably, the engine 409 comprises an engine control unit which interprets data from input sensors to, among other tasks, calculate the appropriate amount of fuel (via a fuel injector) and/or fuel vapor (via a vapor port injector) to inject into the engine, for instance into the intake manifold or cylinder. When signaled by the engine control unit, the fuel injector opens and sprays pressurized fuel into the engine, and when signaled by the engine control unit, the vapor port injector opens and sprays compressed enriched airflow 445 into the engine. The engine control unit can send the same signal(s) to both the fuel injectors and vapor port injectors, or can send different signal(s) to both the fuel injectors and vapor port injectors.

Also, or in alternative to the use of a vapor input adapter 408 for inputting the enriched airflow 445 into the engine, the airflow enriching device 400 could utilize vapor port injectors 410 for injecting the enriched airflow 445 into the fuel rail 412 of the fuel injector system. Thus, either the vapor input adapter 408 and/or the fuel rail 412 could be absent in a particular exemplary airflow enriching device 400.

Alternatively, the fifth exemplary airflow enriching device 400, would not comprise an ultrasonic vaporizer, and/or the fuel supplied to the reaction chamber 404 by fuel line 411 could further be supplied to the engine 409 by a second fuel line.

Figure 19:
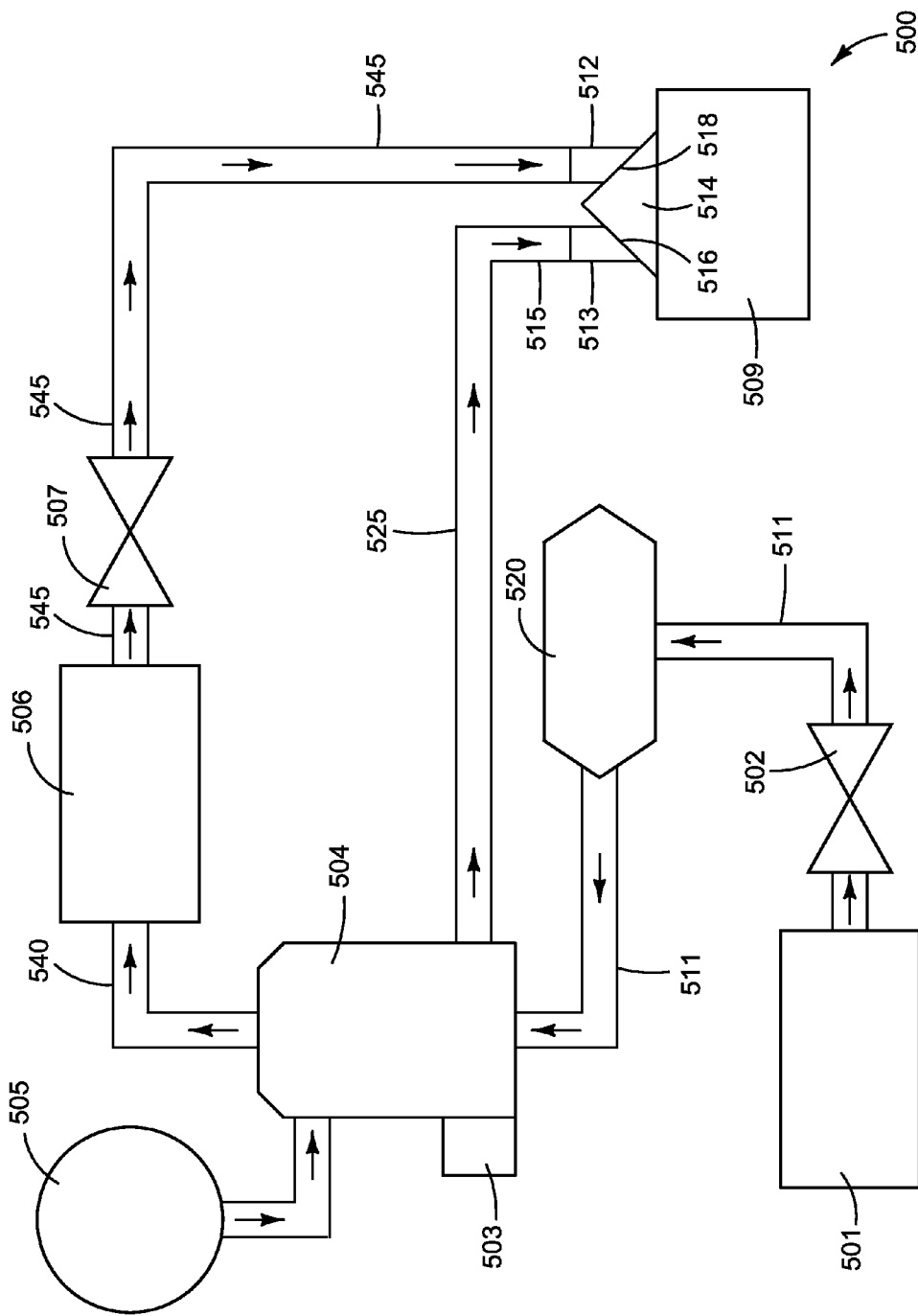
FIG. 19 is a schematic representation of a fifth exemplary airflow enriching device.

A sixth exemplary airflow enriching device 500 is schematically illustrated generally in FIG. 19. FIG. 19 illustrating that the airflow enriching device 500 fluidly connects via a fuel line 511 with a fuel source 501 for supplying fuel to the device 500 and the engine 509. Preferably, a valve 502 is connected between the fuel source 501 and the airflow enriching device 500 for allowing the supply of fuel to be turned on/off as needed. A pump (not illustrated) can be provided, if desired, for instance within the fuel source 501, in-line with the fuel line 511, etc.

It is preferred that the airflow enriching device 500 include an ultrasonic vaporizer 520, for instance, located in-line between the valve 502 and the reaction chamber 504, or otherwise connected to or integrated into the reaction chamber 504. The ultrasonic vaporizer 520 for applying ultrasonic waves to the airflow enriching device 500, the fuel and/or reaction chamber 504 for facilitating the fuel expansion and/or vaporization processes of the airflow enriching device, resulting in higher vapor concentration and flow rates for displacement motors.

For instance, the ultrasonic vaporizer 520 could convert the liquid fuel into a heavy vapor containing small, atomized particles of fuel. This heavy vapor is then supplied to the reaction chamber 504 for expansion, recreating the enriched airflow. Utilization of such an ultrasonic vaporizer 520 will help keep the size of the expansion chamber as small as possible. One exemplary ultrasonic vaporizer is operated by 12 volt current. A skilled artisan will be able to select an appropriate ultrasonic vaporizer in a particular embodiment based on various considerations, including the intended use of the airflow enrichment device, and the equipment and/or accessories with which the airflow enrichment device is intended to be used, among other considerations.

The fuel is supplied to a reaction chamber 504. The reaction chamber 504 containing a level of fuel therein, the level being controlled by an electronic fuel level control 503 or other sensor. The reaction chamber 504 for generating an enriched airflow 540 for combustion in the engine 509.

Preferably, a vacuum regulator 505 connects with the reaction chamber 504 for regulating the vacuum in the reaction chamber 504, for keeping it at a desired pressure level, thereby assisting in controlling the expansion of the fuel. It is preferred that the vacuum regulator 505 be adjustable, allowing the desired pressure level to be adjusted, as desired. The vacuum regulator 505 preferably serving as the source of the airflow in the airflow enriching device 500. In other exemplary airflow enriching devices, an enriched airflow generator may or may not be utilized.

The airflow enriching device 500 preferably further comprising an enriched airflow generator 506 for producing a pressure differential in the enriched airflow 540 and generating a compressed enriched airflow 545. The enriched airflow generator 506 preferably creating pressure differential in the airflow enriching device 500, drawing airflow through the vacuum regulator 505 and into the reaction chamber 504 to create the enriched airflow 540. The enriched airflow generator 506 can be powered by any means, included but not limited to via a belt driven by the engine.

It is preferred that the output of compressed enriched airflow 545 from the enriched airflow generator 506 be interrupted by a vapor flow controller 507. The vapor flow controller 507 for regulating the flow of compressed enriched airflow 545 into the engine 509.

In the embodiment illustrated in this Figure, the vapor flow controller 507 fluidly connects with the engine 509 via a connector 512 connecting to the manifold 514 at a first injector port 518.

Unexpanded fuel passes through the reaction chamber 504 and on to the engine 509 via a fuel supply line 525 fluidly connecting to a fuel injector rail 515. A fuel pump may be associated with the fuel supply line for pumping the fuel. A fuel injector 513 fluidly connects to the fuel injector rail 515 and to manifold 514 of the engine 509 at a second injector port 516. It is preferred that both the first injector port 518 and the second injector port 516 be associated with the same cylinder of the engine, thereby providing both a supply of vaporized fuel and unvaporized fuel to the cylinder. Additional injector ports, connectors, and fuel injectors could be provided, as necessary, associated with additional cylinders of the engine. While this is one manner of fluidly connecting the airflow enriching device to the vehicle's engine, a skilled artisan will be able to select an appropriate structure and configuration for the connection in a particular embodiment based on various considerations, including the equipment and/or accessories with which the vehicle is already configured, among other considerations.

Preferably, the engine 509 comprises an engine control unit which interprets data from input sensors to, among other tasks, calculate the appropriate amount of fuel (via a fuel injector 513) and/or fuel vapor (via a connector 512 from vapor flow controller 507) to inject into the engine. When signaled by the engine control unit, the vapor flow controller 507 generates a compressed enriched airflow 545 which is sprayed, via connector 512, into the engine. The engine control unit can send the same signal(s) to both the fuel injector(s) and the vapor flow controller 507, or can send different signal(s) to both the fuel injector(s) and vapor flow controller 507.

Alternatively, rather than utilizing a dual fuel injector port manifold illustrated, the enriched airflow 545 could be injected into the fuel rail 515 of the fuel injector system.

Alternatively, the sixth exemplary airflow enriching device 500, would not comprise an ultrasonic vaporizer, and/or the fuel supplied to the reaction chamber 504 by fuel line 511 would not be supplied to the engine 509 by a second fuel line and instead a separate fuel line would supply fuel from the fuel source to the rail 515.

Figure 20:
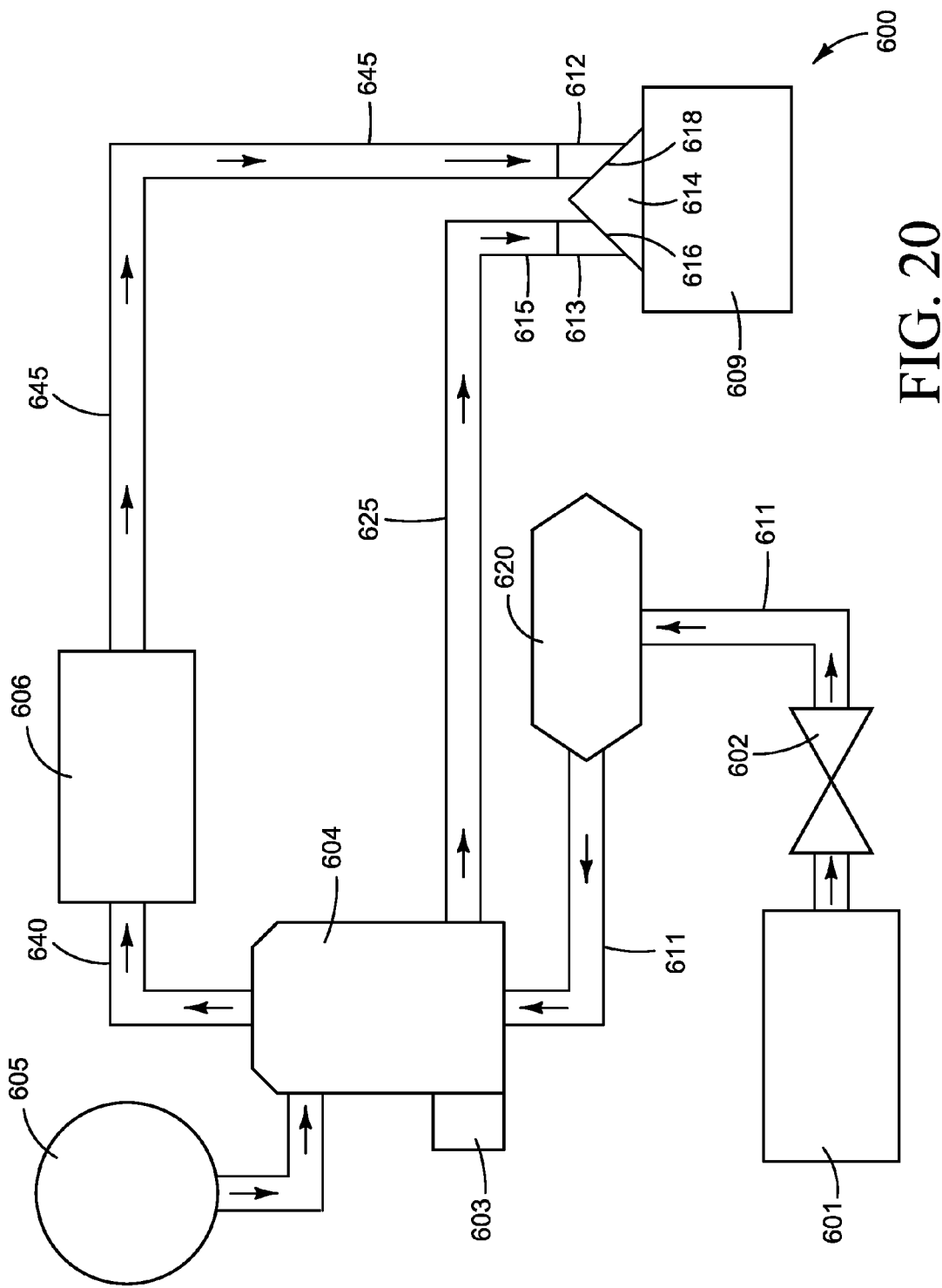
FIG. 20 is a schematic representation of a sixth exemplary airflow enriching device.

A seventh exemplary airflow enriching device 600 is schematically illustrated generally in FIG. 20. FIG. 20 illustrating that the airflow enriching device 600 fluidly connects via a fuel line 611 with a fuel source 601 for supplying fuel to the device 600 and the engine 609. Preferably, a valve 602 is connected between the fuel source 601 and the airflow enriching device 600 for allowing the supply of fuel to be turned on/off as needed. A pump (not illustrated) can be provided, if desired, for instance within the fuel source 601, in-line with the fuel line 611, etc.

It is preferred that the airflow enriching device 600 include an ultrasonic vaporizer 620, for instance, located in-line between the valve 602 and the reaction chamber 604, or otherwise connected to or integrated into the reaction chamber 604. The ultrasonic vaporizer 620 for applying ultrasonic waves to the airflow enriching device 600, the fuel and/or reaction chamber 604 for facilitating the fuel expansion and/or vaporization processes of the airflow enriching device, resulting in higher vapor concentration and flow rates for displacement motors.

For instance, the ultrasonic vaporizer 620 could convert the liquid fuel into a heavy vapor containing small, atomized particles of fuel. This heavy vapor is then supplied to the reaction chamber 604 for expansion, recreating the enriched airflow. Utilization of such an ultrasonic vaporizer 620 will help keep the size of the expansion chamber as small as possible. One exemplary ultrasonic vaporizer is operated by 12 volt current. A skilled artisan will be able to select an appropriate ultrasonic vaporizer in a particular embodiment based on various considerations, including the intended use of the airflow enrichment device, and the equipment and/or accessories with which the airflow enrichment device is intended to be used, among other considerations.

The fuel is supplied to a reaction chamber 604. The reaction chamber 604 containing a level of fuel therein, the level being controlled by an electronic fuel level control 603 or other sensor. The reaction chamber 604 for generating an enriched airflow 640 for combustion in the engine 609.

Preferably, a vacuum regulator 605 connects with the reaction chamber 604 for regulating the vacuum in the reaction chamber 604, for keeping it at a desired pressure level, thereby assisting in controlling the expansion of the fuel. It is preferred that the vacuum regulator 605 be adjustable, allowing the desired pressure level to be adjusted, as desired. The vacuum regulator 605 preferably serving as the source of the airflow in the airflow enriching device 600. In other exemplary airflow enriching devices, an enriched airflow generator may or may not be utilized.

The airflow enriching device 600 preferably further comprising an enriched airflow generator 606 for producing a pressure differential in the enriched airflow 640 and generating a compressed enriched airflow 645. The enriched airflow generator 606 preferably creating pressure differential in the airflow enriching device 600, drawing airflow through the vacuum regulator 605 and into the reaction chamber 604 to create the enriched airflow 640. The enriched airflow generator 606 can be powered by any means, included but not limited to via a belt driven by the engine.

In the embodiment illustrated in this Figure, the compressed enriched airflow 645 is fluidly connected with a vapor injector 612 connecting to the engine's manifold 614 at a first injector port 618.

In this embodiment, unexpanded fuel passes through the reaction chamber 604 and on to the engine 609 via a fuel supply line 625 fluidly connecting to a fuel injector rail 615. A fuel pump may be associated with the fuel supply line for pumping the fuel. A fuel injector 613 fluidly connects to the fuel injector rail 615 and to manifold 614 of the engine 609 at a second injector port 616. Alternatively, fuel supply line 625 could directly connect with the fuel line 611, the fuel source 601, or another fuel source.

It is preferred that both the first injector port 618 and the second injector port 616 be associated with the same cylinder of the engine, thereby providing both a supply of vaporized fuel and unvaporized fuel to the cylinder. Additional injector ports, vapor injectors, and fuel injectors could be provided, as necessary, associated with additional cylinders of the engine. While this is one manner of fluidly connecting the airflow enriching device to the vehicle's engine, a skilled artisan will be able to select an appropriate structure and configuration for the connection in a particular embodiment based on various considerations, including the equipment and/or accessories with which the vehicle is already configured, among other considerations.

Preferably, the engine 609 comprises an engine control unit which interprets data from input sensors to, among other tasks, calculate the appropriate amount of fuel (via a fuel injector 613) and/or fuel vapor (via vapor port injector 612) to inject into the engine 609. When signaled by the engine control unit, the fuel injector 613 sprays fuel into the engine 609, and the vapor port injector 612 sprays compressed enriched airflow 645 into the engine 609. The engine control unit can send the same signal(s) to both the fuel injector(s) and the vapor port injector(s) 612, or can send different signal(s) to both the fuel injector(s) 613 and the vapor port injector(s) 612.

Alternatively, rather than utilizing a dual fuel injector port manifold illustrated, the enriched airflow 645 could be injected into the fuel rail 615 of the fuel injector system.

Alternatively, the seventh exemplary airflow enriching device 600, would not comprise an ultrasonic vaporizer, and/or the fuel supplied to the reaction chamber 604 by fuel line 611 would not be supplied to the engine 609 by a second fuel line and instead a separate fuel line would supply fuel from the fuel source to the rail 615.

The exemplary airflow enriching devices and methods are not necessarily limited to use on internal combustion engines. Exemplary airflow enriching devices and methods may also be utilized as an enriched and expanded fuel generator. Likewise, exemplary airflow enriching devices and methods could further be defined as the product arrived at through use of the process(es) enumerated in this disclosure.

Any suitable structure and/or material can be used for the components of the exemplary devices, and a skilled artisan will be able to select an appropriate structure and material for the components in a particular embodiment based on various considerations, including the intended use of the device, the intended arena within which the device will be used, and the equipment and/or accessories with which the device is intended to be used, among other considerations. The reaction chamber and vapor flow controller can be formed from metal materials, including stainless steel and other suitable metals. Materials hereinafter discovered and/or developed that are determined to be suitable for use in airflow enriching devices would also be considered suitable for use in an airflow enriching devices according to a particular embodiment.

It is noted that all structure and features of the various described and illustrated airflow enriching devices can be combined in any suitable configuration for inclusion in an airflow enriching device according to a particular embodiment. For example, an airflow enriching device according a particular embodiment can include neither, one, or both of enriched airflow generator and the heater described above.

Figure 21:
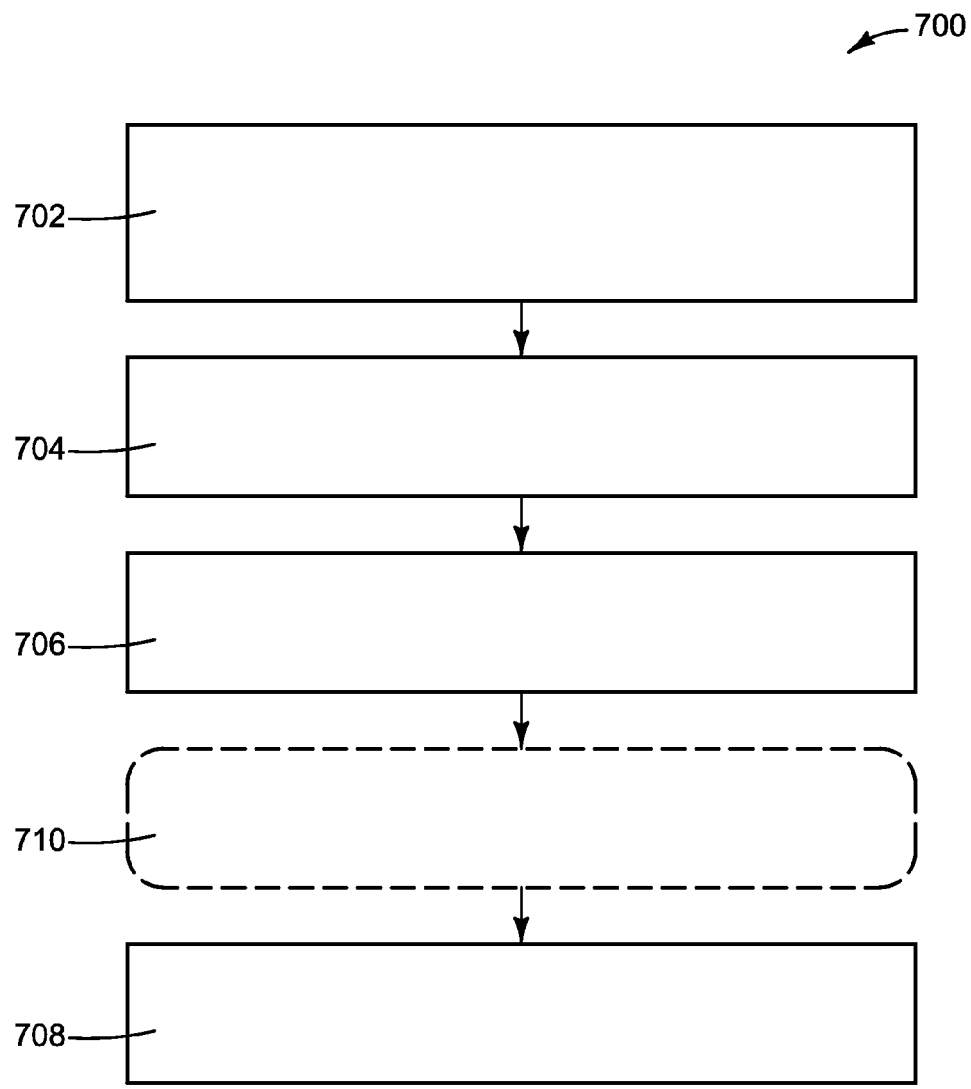
FIG. 21 is a flowchart illustrating a first exemplary method.

FIG. 21 illustrates a first exemplary method 700 of enriching intake airflow into an internal combustion engine having an intake manifold. At step 702, under vacuum pressure, airflow is bubbled through a volume of fuel contained in a reaction chamber to form an enriched airflow. At step 704, the vacuum pressure in the reaction chamber is maintained at between about 203.2 mmHg and 254 mmHg. At step 706, the fuel in the reaction chamber is maintained at a temperature of between 38° C. and 54.5° C. Finally, at step 708, the enriched airflow is injected into the intake manifold of the internal combustion engine.

Optionally, at step 710, the enriched airflow is compressed before performing the step of injecting the enriched airflow into the intake manifold of the internal combustion engine.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. An airflow enriching device for an internal combustion engine, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said outlet conduit interrupted by an enriched airflow generator for generating a compressed enriched airflow, said vapor flow controller further comprising an actuator for opening and closing said actuator valve, said outlet conduit fluidly connecting with the engine.

2. The airflow enriching device of claim 1, wherein said air source is vacuum regulated, and said air source comprises a vacuum regulator.

3. The airflow enriching device of claim 1, wherein said internal combustion engine is in a vehicle, wherein said vehicle has a computer system, and wherein said actuator is electronically controlled by said computer system.

4. The airflow enriching device of claim 1, wherein the vacuum contained within the reaction chamber is maintained at a pressure of between 203.2 mmHg and 254 mmHg.

5. The airflow enriching device of claim 1, further comprising a heater, wherein said heater maintains the fuel in the reaction chamber at a temperature of between 38° C. and 54.5° C.

6. The airflow enriching device of claim 5, wherein the temperature is maintained at about 49° C.

7. The airflow enriching device of claim 1, further comprising a heater, wherein said heater maintains the fuel in the reaction chamber at a temperature of between 38° C. and 54.5° C., and wherein the vacuum contained within the reaction chamber is maintained at a pressure of between 203.2 mmHg and 254 mmHg.

8. The airflow enriching device of claim 1, wherein said aerator comprises a top plate spaced apart from a bottom plate, said plates defining a chamber therebetween, said aerator further comprising a plurality of bubbler holes defined through at least one of said top plate and said bottom plate; wherein said air source comprises a vacuum regulator; wherein an enriched airflow generator interrupts said outlet conduit, said enriched airflow generator for generating a compressed enriched airflow; and wherein said internal combustion engine further comprises a throttle body, and wherein said actuator is wired in parallel with said throttle body.

9. An airflow enriching device for an internal combustion engine, said internal combustion engine comprising a throttle body, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit, wherein said aerator comprises a top plate spaced apart from a bottom plate, said plates defining a chamber therebetween, said aerator further comprising a plurality of bubbler holes defined through at least one of said top plate and said bottom plate, wherein said air source comprises a vacuum regulator; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said outlet conduit fluidly connecting with the engine, wherein an enriched airflow generator interrupts said outlet conduit, said enriched airflow generator for generating a compressed enriched airflow, and wherein said actuator is wired in parallel with said throttle body.

10. The airflow enriching device of claim 9, wherein said internal combustion engine is in a vehicle, wherein said vehicle has a computer system, and wherein said actuator is electronically controlled by said computer system, and wherein said internal combustion engine comprises a throttle body comprising a butterfly valve configured to be opened and closed, wherein said actuator is wired in parallel with said throttle body to the computer system, wherein the opening of the butterfly valve also results in the opening of the actuator valve, and where the closing of the butterfly valve also results in the closing of the actuator valve.

11. An airflow enriching device for an internal combustion engine of a vehicle, said internal combustion engine comprising a throttle body further comprising a butterfly valve configured to be opened and closed, said vehicle comprising a computer system, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said actuator is wired in parallel with said throttle body wherein the opening of the butterfly valve results in the opening of the actuator valve and the closing of the butterfly valve results in the closing of the actuator valve, said actuator is electronically controlled by said computer system, said outlet conduit fluidly connecting with the engine.

12. An airflow enriching device for an internal combustion engine, said internal combustion engine comprising a throttle body, said throttle body comprising a butterfly valve configured to be opened and closed, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said actuator comprising a second throttle body, said outlet conduit fluidly connecting with the engine.

13. An airflow enriching device for an internal combustion engine, said internal combustion engine comprising a throttle body, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said actuator is wired in parallel with said throttle body, said outlet conduit fluidly connecting with the engine.

14. An airflow enriching device for an internal combustion engine, said internal combustion engine comprising a throttle body spacer having a throttle body spacer inlet port, said airflow enriching device comprising a reaction chamber and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said outlet conduit fluidly connecting with said throttle body spacer inlet port, said throttle body spacer configured for attachment to an airflow intake system of the engine.

15. The airflow enriching device of claim 14, wherein the engine comprises an intake manifold, and wherein said throttle body spacer attaches to the airflow intake system between the intake manifold and throttle body.

16. An airflow enriching device for an internal combustion engine of a vehicle, said internal combustion engine comprising a throttle body further comprising a butterfly valve configured to be opened and closed, said vehicle comprising a computer system, said airflow enriching device comprising a reaction chamber, a throttle body spacer having a throttle body spacer inlet port and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said actuator is electronically controlled by said computer system and is wired in parallel with said throttle body wherein the opening of said butterfly valve results in the opening of said actuator valve and the closing of said butterfly valve results in the closing of said actuator valve, said outlet conduit fluidly connecting with said throttle body spacer inlet port, said throttle body spacer configured for attachment to an airflow intake system of the engine.

17. The airflow enriching device of claim 16, wherein said engine comprises an intake manifold, and wherein said throttle body spacer attaches to the airflow intake system between the intake manifold and throttle body.

18. An airflow enriching device for an internal combustion engine of a vehicle, said internal combustion engine comprising a throttle body further comprising a butterfly valve configured to be opened and closed, said vehicle comprising a computer system, said airflow enriching device comprising a reaction chamber, a throttle body spacer having a throttle body spacer inlet port and a vapor flow controller, wherein:

the reaction chamber is operable to hold a supply of liquid fuel at a selected level therein, said reaction chamber comprising an aerator submerged below said selected level of liquid fuel, said aerator fluidly connecting with an air supply line for supplying a flow of air, wherein said aerator comprises a top plate spaced apart from a bottom plate, said plates defining a chamber therebetween, said aerator further comprising a plurality of bubbler holes defined through at least one of said top plate and said bottom plate, said air supply line fluidly connected to an air source, said reaction chamber defining an air-fuel vapor mixing chamber, wherein said flow of air is bubbled through said fuel thereby creating an enriched airflow, said air-fuel vapor mixing chamber fluidly connecting to a vapor flow controller via an inlet conduit; and the vapor flow controller for controlling the flow of the enriched airflow into the engine, said vapor flow controller comprising an enriched airflow passageway interrupted by an actuator valve, said passageway fluidly connecting at a first end with said inlet conduit, said passageway fluidly connecting at a second end with an outlet conduit, said vapor flow controller further comprising an actuator for opening and closing said actuator valve, said actuator is electronically controlled by said computer system and is wired in parallel with said throttle body to said computer system wherein the opening of said butterfly valve results in the opening of said actuator valve and the closing of said butterfly valve results in the closing of said actuator valve, said outlet conduit fluidly connecting with said throttle body spacer inlet port, said throttle body spacer configured for attachment to an airflow intake system of the engine.

* * * * *